(12) United States Patent
Booth, Jr. et al.

(10) Patent No.: US 11,449,510 B1
(45) Date of Patent: Sep. 20, 2022

(54) ONE WAY CASCADING OF ATTRIBUTE FILTERS IN HIERARCHICAL OBJECT MODELS

(71) Applicant: Tableau Software, Inc., Seattle, WA (US)

(72) Inventors: Jeffrey Mark Booth, Jr., Seattle, WA (US); Justin Talbot, Seattle, WA (US); Daniel Cory, Seattle, WA (US); Russell Steven Paul-Jones, Duvall, WA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 469 days.

(21) Appl. No.: 16/557,815

(22) Filed: Aug. 30, 2019

(51) Int. Cl.
*G06F 16/2455* (2019.01)
*G06F 16/2457* (2019.01)
*G06F 16/22* (2019.01)
*G06F 16/28* (2019.01)

(52) U.S. Cl.
CPC ...... *G06F 16/2456* (2019.01); *G06F 16/2246* (2019.01); *G06F 16/24573* (2019.01); *G06F 16/289* (2019.01)

(58) Field of Classification Search
None
See application file for complete search history.

(56) References Cited

U.S. PATENT DOCUMENTS 9,633,076 B1 * 4/2017 Morton ................. G06F 16/248
2008/0243764 A1 * 10/2008 Meijer ............. G06F 16/24544

* cited by examiner

*Primary Examiner* — Amresh Singh
(74) *Attorney, Agent, or Firm* — Morgan, Lewis & Bockius LLP

(57) ABSTRACT

A method generates a data source. A user selects a first data set from a displayed object model of a database. The object model includes data sets linked visually by many-to-one relationships to form a tree. The user selects a data field in the first data set and specifies a filter condition. The system identifies a second data set in the tree, and joins the first and second data sets. When the second data set is related to the first data set via one or more many-to-one relationships, rows of the second data set are joined to rows of the first data set that satisfy the first filter condition. When the second data does not satisfy the condition, the second data set is joined to rows of the first data set that satisfy the first filter condition, and all rows of the second data set are included in the generation.

20 Claims, 20 Drawing Sheets

| | | 492 | 494 | 496 | 498 | |
|---|---|---|---|---|---|---|
| P1112-BR | 452 | A1111 | 12345 | Company A | AZ | 52 |
| P1112-BL | 71 | A1111 | 12345 | Company A | AZ | 52 |
| P1112-WH | 2 | A1111 | 12345 | Company A | AZ | 52 |
| J44715 | 35 | A1117 | 12345 | Company A | AZ | 52 |
| Null | Null | Null | Null | Null | AL | 7 |
| Null | Null | Null | Null | Null | AK | 2 |
| ... | ... | ... | ... | ... | ... | ... |
| Null | Null | Null | Null | Null | CA | 157 |

ONE WAY CASCADING OF ATTRIBUTE FILTERS IN HIERARCHICAL OBJECT MODELS

TECHNICAL FIELD

The disclosed implementations relate generally generating new data sources, and more specifically to automatic cascading of filters using the hierarchical structure of an object model to extract data for new data sources.

BACKGROUND

Data visualization applications enable a user to understand information in a database visually, including distribution, trends, outliers, and other factors that are important to making business decisions. In some cases, it may be desirable to include only data that is relevant for a specific user or for a specific project. For example, in a large database, the ability to extract only relevant information in the database can improve and streamline the user's workflow. However, asking a user to specify a filter condition for extracting information for each data set in the database can be time consuming, and automatically filtering the entire database for information that meets the specified filter condition may be computationally expensive and/or produce results that are incomplete or unexpected.

Some data visualization applications provide a user interface that enables users to build new data sources by applying filter conditions to selected data fields in a data set and propagating the filter conditions to other related data sets to indirectly filter and define information to be included in the new data source. However, it may be unclear how the specified filter conditions are propagated throughout the entire database based on a user's specified filter conditions.

Propagating filter conditions to a group of joined tables can be straightforward (e.g., using inner joins), but may lead to unexpected missing data depending on the relationships between the tables and the selected data fields. Alternatively, a process may require a user to specify exactly which data sets the filter condition should be applied to (e.g., specifying the type of join between each pair of joined tables). This requires user knowledge of all the tables and how the joins affect the results. Thus, the technical problem of meaningfully propagating filter conditions throughout a set of tables can be particularly challenging.

SUMMARY

Generating a new data source that combines data from multiple data sets can be challenging. In some cases, it can help to organize the data as a hierarchical object model. By storing relationships between different data sets in a database as a hierarchical object model, relationships between data sets can be leveraged to assist users who wish to extract a portion of the information in the database to create a new data source.

An object is a collection of named attributes. An object often corresponds to a real-world object, event, or concept, such as a Store. The attributes are descriptions of the object that are conceptually at a 1:1 relationship with the object. Thus, a Store object may have a single [Manager Name] or [Employee Count] associated with it. At a physical level, an object is often stored as a row in a relational table, or as an object in JSON.

A class is a collection of objects that share the same attributes. It must be analytically meaningful to compare objects within a class and to aggregate over them. At a physical level, a class is often stored as a relational table, or as an array of objects in JSON.

An object model is a set of classes and a set of many-to-one relationships between them. Classes that are related by 1-to-1 relationships are conceptually treated as a single class, even if they are meaningfully distinct to a user. In addition, classes that are related by 1-to-1 relationships may be presented as distinct classes in a data visualization user interface. Many-to-many relationships are conceptually split into two many-to-one relationships by adding an associative table capturing the relationship. Thus, in a hierarchical object model, the objects are organized in a hierarchical order based on their classes. FIG. 3 provides an example of how a database that includes multiple logical tables may be organized in a hierarchical object model of object classes. As used herein, an object class is typically referred to as a "data set." In some instances, a data set corresponds almost exactly to a single physical table in a database. In some instances, a single physical table in a database corresponds to two or more logically distinct data sets.

Once an object model is constructed, a data visualization application can assist a user in various ways. In some implementations, a user can visually see and understand the many-to-one relationships that exist between different data sets of the database. For example, when a user interacts with a data field in a data set (e.g., to apply a filter condition to the data field), the data visualization application propagates the filter condition appropriately throughout the object model using the hierarchical relationships in the object model.

In accordance with some implementations, a method of generating new data sources is performed at a computer having one or more processors and memory. The memory stores one or more programs configured for execution by the one or more processors. The computer receives user selection of a first data set from a displayed object model of a database. The displayed object model includes a plurality of data sets linked visually by many-to-one relationships to form a tree. The computer also receives user selection of a data field of a plurality of data fields in the first data set, as well as user specification of a first filter condition for the selected data field. The computer then identifies a second data set in the tree. The computer generates a new data source by joining the first data set and the second data set. When the second data set is related to the first data set through a sequence of one or more many-to-one relationships, the computer automatically generates the new data source by joining rows of the second data set to rows of the first data set that satisfy the first filter condition. When the second data set is not related to the first data set through a sequence of one or more many-to-one relationships, the computer automatically generates the new data source by joining rows of the second data set to rows of the first data set that satisfy the first filter condition, and also includes all rows of the second data set in the new data source (i.e., rows in the second data set that are not already joined to rows from the first data set).

In some instances, the data includes a third data set that has a direct many-to-one relationship with the first data set and a direct one-to-many relationship with the second data set. The computer generates the new data source by automatically joining rows of the third data set to rows of the first data set that satisfy the first filter condition.

In some instances, the tree includes a third data set that has a direct one-to-many relationship with the first data set. The computer generates the new data source by automatically joining rows of the third data set to rows of the first data set that satisfy the first filter condition, and including all rows of the third data set in the new data source (e.g., as an outer join).

In some instances, the tree includes a third data set that has a direct one-to-many relationship with the second data set, and the second data set has a direct many-to-one relationship with the first data set. The computer generates the new data source by automatically joining rows of the second data set to rows of the third data set, and including all rows of the third data set in the new data source.

In some instances, the computer receives user selection of a second data field of a plurality of data fields in the second data set. The computer also receives user specification of a second filter condition for the selected second data field. When the second data set is related to the first data set through a sequence of one or more many-to-one relationships, the computer automatically generates the new data source by joining rows of the second data set that satisfy the second filter condition to rows of the first data set that satisfy the first filter condition. When the second data set is not related to the first data set through a sequence of one or more many-to-one relationships, the computer automatically generates the new data source by joining rows of the second data set that satisfy the second filter condition to rows of the first data set that satisfy the filter condition, and including all rows of the second data set that satisfy the second filter condition in the new data source.

In some instances, the tree includes a third data set. The computer receives user selection of the third data set, a third data field of a plurality of data fields of the third data set, and user specification of a third filter condition for the selected third data field. When the third data set is related to the first data set through a sequence of one or more many-to-one relationships, the computer automatically generates the new data source by joining rows of the third data set that satisfy the third filter condition to rows of the first data set that satisfy the first filter condition. When the third data set is not related to the first data set through a sequence of one or more many-to-one relationships, the computer automatically generates the new data source by joining rows of the third data set that satisfy the third filter condition to rows of the first data set that satisfy the filter condition, and including all rows of the third data set in the new data source.

In some instances, the computer receives user selection of a subset of the plurality of data sets that includes the first data set and the second data set. The computer generates the new data source by joining each data set of the subset of the plurality of data sets to the first data set.

In some instances, to generate the new data source, the computer joins each data set of the tree to the first data set.

In some implementations, in response to receiving the user selection of the data field and the filter condition, the computer automatically applies the filter condition to the selected data field.

In some instances, the computer receives user selection of one or more additional data fields of the plurality of data fields in the first data set and user specification of one or more additional filter conditions for the one or more additional data fields. In response to receiving the user selection of one or more additional data fields and the user specification of one or more additional filter conditions, the computer automatically applies an additional filter condition of the one or more additional filter conditions to an additional data field of the one or more additional data fields.

In some instances, the computer receives user selection of one or more additional filter conditions to be applied to the selected data field. In response to receiving the user selection of the one or more additional filter conditions, the computer automatically applies the one or more additional filter conditions to the selected data field.

In some instances the selected data field has a numeric data type, and the first filter condition specifies a range of numeric values for the selected data field (e.g., [Sales]>10K or [Magnitude] between 1.0 and 2.0).

In some instances the selected data field stores discrete categorical values, and the first filter condition specifies one or more discrete values for the selected data field. For example, [COUNTRY]="CANADA" or [State]="CA", "OR", or "WA".

In some instances, the first filter condition specifies a mathematical expression. For example, the filter condition may select only information in a data field that includes values that are greater than, less than, or equal to a specific value or range of values. Alternatively, the filter condition may select only information in a data field that includes values that are not equal to a specific value or are not within a specific range.

In some instances, the first filter condition includes a Boolean combination of filter conditions, each of which operates on one or more data fields in the first data set.

Some examples of filter conditions include:
[COUNTRY FIELD]="CANADA";
$400<[SALES FIELD]<$700;
[NUMBER FIELD] 0, 115, 42-82;
[LOCATION FIELD]=("CANADA" OR "USA") AND "CALIFORNIA"; and
[STATE FIELD]=NOT "CALIFORNIA", NOT "WASHINGTON";
[MANUFACTURE COUNTRY] AND [SALES COUNTRY]="CANADA" OR "USA";
[MANUFACTURE COUNTRY] OR [SALES COUNTRY]="CANADA".

In accordance with some implementations, a system for generating data sources includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and graphical user interfaces are provided for interactive generation of data sources.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIGS. 4A-4E provide an example of generating a data source from a hierarchical object model according to some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
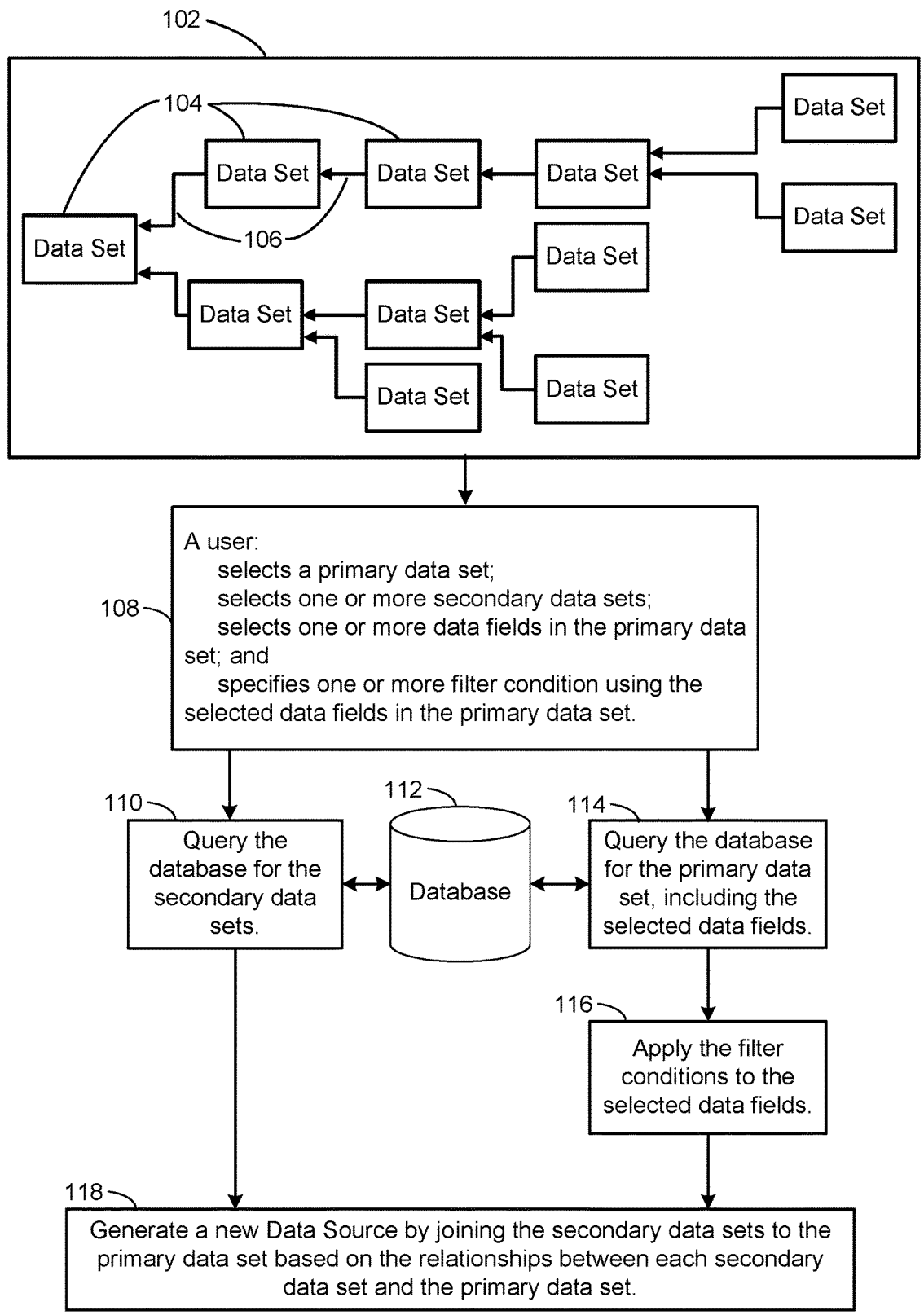
FIG. 1 illustrates conceptually a process of generating a new data source in accordance with some implementations.

Some implementations of an interactive data visualization application use an object model 102 to show relationships 106 between data sets 104, as shown in FIG. 1. The data sets 104 that are part of the object model may be stored locally (e.g., on the same device that is displaying the user interface) or may be stored externally (e.g., on a database server or in the cloud). Each relationship 106 is a many-to-one relationship between two data sets 104 in the object model. (The arrows point from the "one" side of each relationship to the "many" side of the relationship.) The hierarchical structure of the object model allows the relationships between the data sets 104 in the object model to be visualized. The object model 102 may also show characteristics or data fields that are present in each of the data sets 104 and link them to other data fields or characteristics in related data sets. The many-to-one relationships between the data sets 104 shows the organizational structure of the data set model 102. In some instances, each data set corresponds to a database table or a distinct physical file.

In most instances, when generating a new data source, not all of the information, characteristics, and data fields in the database are included in the new data source.

Some implementations of an interactive data visualization application use an object model 102 to generate new data sources using information from existing data retrieved from a database 112. In some instances, an object model 102 applies to one database (e.g., one SQL database or one spreadsheet file), but an object model may encompass two or more databases. Typically, unrelated databases have distinct object models. In some instances, the object model 102 closely mimics the data model of the physical database (e.g., classes in the object model correspond to tables in a database). However, in some cases the object model 102 is more normalized (or less normalized) than the physical data sources. An object model 102 groups together attributes (e.g., data fields) that have a one-to-one relationship with each other to form classes (data sets 104), and identifies many-to-one relationships 106 among the classes. In the illustrations below, the many-to-one relationships are illustrated with arrows, with the arrows originating from the "one" side of the relationship and pointing towards the "many" side of each relationship. When an object model is constructed, it can facilitate generating new data sources based on the data fields and conditional filters that a user specifies.

To generate a new data source, a user selects (108) a primary data set, selects (108) one or more secondary data sets, selects (108) one or more data fields in the primary data set, and specifies (108) one or more filter conditions for the selected data fields. (Creating data sources does not require any filter conditions, but they are used in the example here.) In some instances, one filter condition is selected to be applied to one selected data field, but multiple filter conditions may be applied to multiple data fields, which may be in the same or different data sets.

The data source generator 226 queries (110) the database 112 for data sets that have been selected to be included in the new data source, and generates a new data source using information from the selected data sets. The new data source is constructed (118) according to selected (114) data fields in the primary data source and filter conditions that are applied (116) to the selected data fields.

Figure 2A:
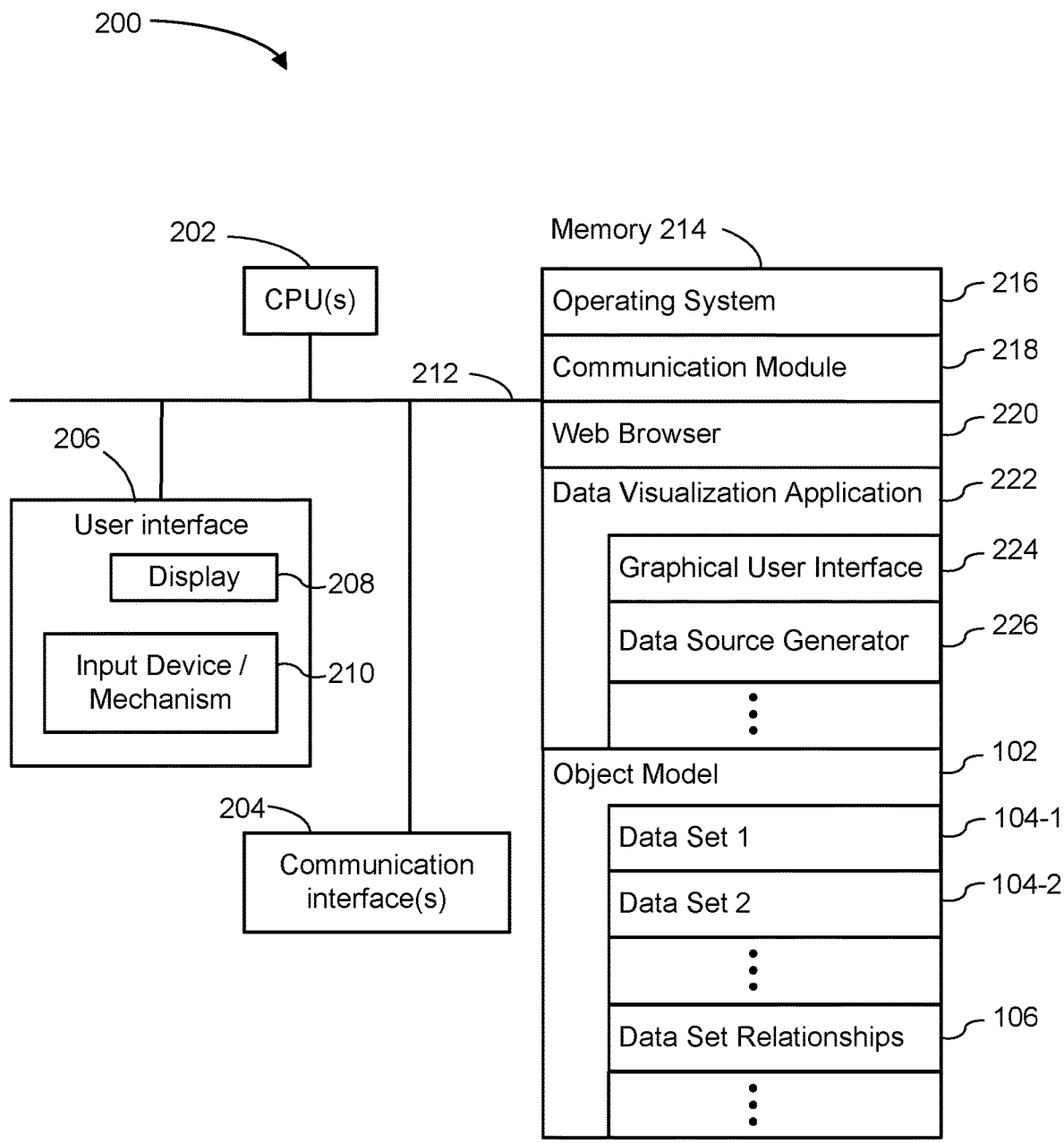
FIG. 2A is a block diagram of a computing device according to some implementations.

FIG. 2A is a block diagram illustrating a computing device 200 that can execute a data visualization application 222 or a data visualization web application to display a data visualization. In some implementations, the computing device displays a graphical user interface 224 for the data visualization application. Computing devices 200 include desktop computers, laptop computers, tablet computers, and other computing devices with a display and a processor capable of running a data visualization application 222. The data visualization application 222 may include a data source generator for database organization (e.g., generating object models for databases) as well as generating new data sources using existing databases. A computing device 200 typically includes one or more processing units/cores (CPUs) 202 for executing modules, programs, and/or instructions stored in the memory 214 and thereby performing processing operations, one or more network or other communications interfaces 204, memory 214, and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;

a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;

a web browser 220 (or other client application), which enables a user to communicate over a network with remote computers or devices;

a data visualization application 222, which provides a graphical user interface 224 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application);

the data visualization application 222 includes a graphical user interface 224, which enables a user to build data visualizations by specifying elements visually, and also provides a graphical view to access or build object models and data sources;

the data visualization application also includes a data source generator 226, which generates data sources according to user specification. In accordance with some implementations, the data source generator 226 uses an object model 102 to determine how filter conditions are to be applied to different data fields within the database 112. For each new data source that is generated, this process uses relationships 106 between the data sets 104 in the object model 102 and based on the relationships, propagates the filter conditions to the selected data sets in order to generate the new data source. This is illustrated below in FIGS. 4A-4D and 5A-5B; and one or more object models 102, which identify the structure of one or more databases 112. Each object model 102 includes a plurality of data sets (classes) 104-1, 104-2, . . . Each object model 102 also includes many-to-one relationships 106 between the data sets 104. In some instances, an object model 102 maps each table within a database to a data set 104, with many-to-one relationships 106 between data sets 104 corresponding to foreign key relationships between the tables. In some instances, the model of an underlying database does not cleanly map to an object model 102 in this simple way, so the object model 102 includes information that specifies how to transform the raw data into appropriate data sets 104. In some instances, the raw data source is a simple file (e.g., a spreadsheet), which is transformed into multiple data sets 104 (e.g., one data set per worksheet tab).

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2A shows a computing device 200, FIG. 2A is intended more as functional description of the various features that may be present rather than as a structural schematic of the implementations described herein. In practice, and as recognized by those of ordinary skill in the art, items shown separately could be combined and some items could be separated.

Figure 2B:
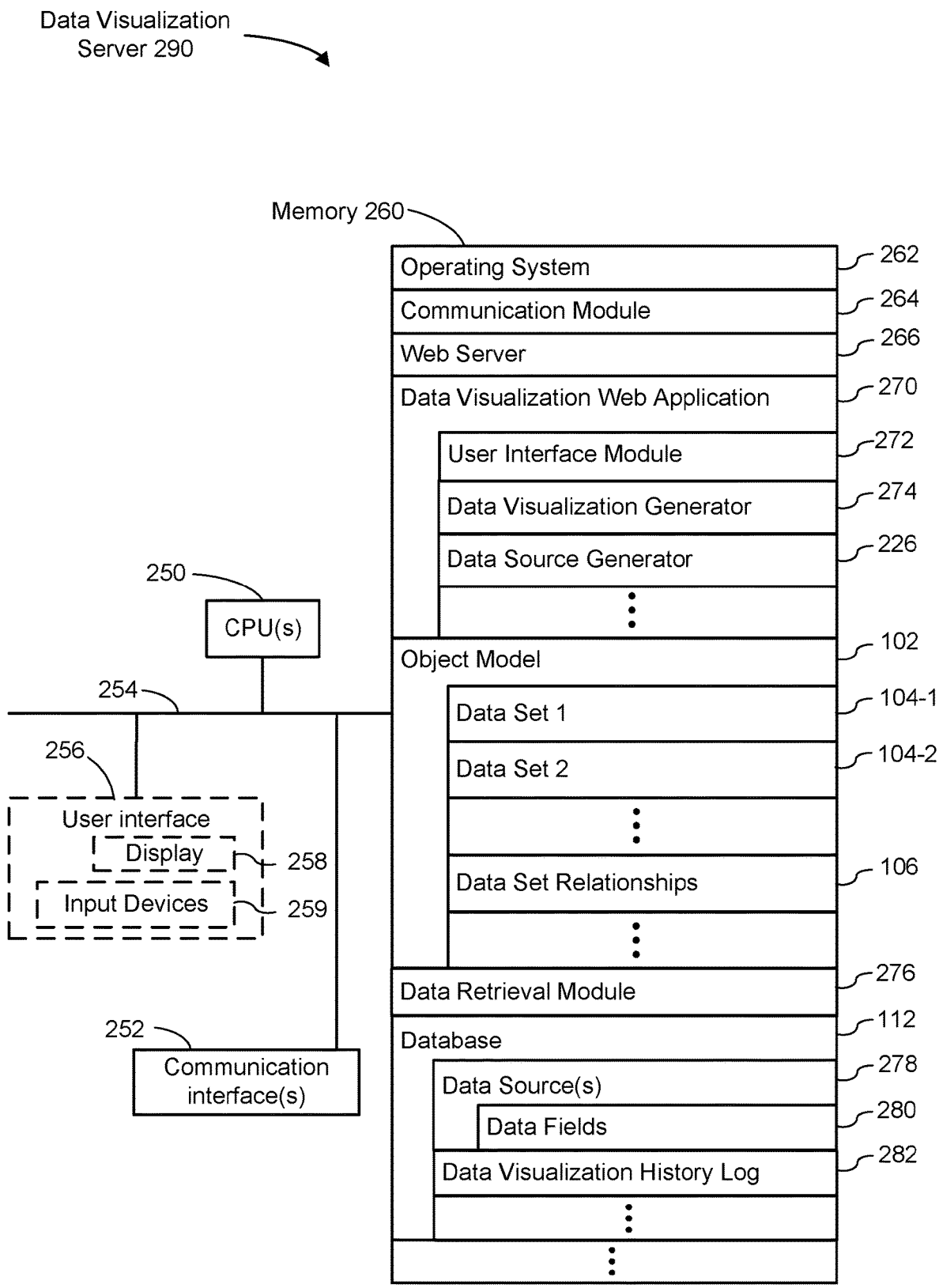
FIG. 2B is a block diagram of a data visualization server according to some implementations.

FIG. 2B is a block diagram of a data visualization server 290 in accordance with some implementations. A data visualization server 290 may host one or more databases 112 or may provide various executable applications or modules. A server 290 typically includes one or more processing units/cores (CPUs) 250, one or more network interfaces 252, memory 260, and one or more communication buses 254 for interconnecting these components. In some implementations, the server 290 includes a user interface 256, which includes a display 258 and one or more input devices 259, such as a keyboard and a mouse. In some implementations, the communication buses 254 include circuitry (sometimes called a chipset) that interconnects and controls communications between system components.

In some implementations, the memory 260 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 260 includes one or more storage devices remotely located from the CPU(s) 250. The memory 260, or alternatively the non-volatile memory devices within the memory 260, comprise a non-transitory computer readable storage medium.

In some implementations, the memory 260, or the computer readable storage medium of the memory 260, stores the following programs, modules, and data structures, or a subset thereof:

an operating system 262, which includes procedures for handling various basic system services and for performing hardware dependent tasks;

a network communication module 264, which is used for connecting the server 290 to other computers via the one or more communication network interfaces 252 (wired or wireless) and one or more communication networks, such as the Internet, other wide area networks, local area networks, metropolitan area networks, and so on;

a web server 266 (such as an HTTP server), which receives web requests from users and responds by providing responsive web pages or other resources;

a data visualization web application 270, which may be downloaded and executed by a web browser 220 on a user's computing device 200. In general, a data visualization web application 270 has the same functionality as a desktop data visualization application 222, but provides the flexibility of access from any device at any location with network connectivity, and does not require installation and maintenance. In some implementations, the data visualization web application 270 includes various software modules to perform certain tasks. In some implementations, the data visualization web application 270 includes a user interface module 272, which provides the user interface for all aspects of the data visualization web application 270;

in some implementations, the data visualization web application includes a data visualization generator 276, which generates and displays data visualizations according to user-selected data sources 278 and data fields 280, as well as one or more object models 102;

in some implementations, the data visualization web application includes a data source generator 226, as described above for a client device 200;

one or more object models 102, as described above for a computing device 200;

a data retrieval module 276, which builds and executes queries to retrieve data from one or more databases 112. The databases 112 may be stored locally on the server 290 or stored at an external database system. In some implementations, data from two or more databases may be blended. In some implementations, the data retrieval module 276 uses a visual specification to build the queries;

one or more databases 112, which store data used or created by the data visualization web application 270 or data visualization application 222. The databases 112 may store data sources 278, which provide the data used in the generated data visualizations. Each data source 278 includes one or more data fields 280. In some implementations, the database 112 stores user preferences. In some implementations, the database 112 includes a data visualization history log 282. In some implementations, the data visualization history log 282 tracks each time the data visualization web application 270 or data visualization application 222 renders a data visualization.

The databases 112 may store data in many different formats, and commonly includes many distinct tables, each with a plurality of data fields 280. Some databases 112 comprise a single table. The data fields 280 include both raw fields from the database (e.g., a column from a database table or a column from a spreadsheet) as well as derived data fields, which may be computed or constructed from one or more other data fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 280 are stored separately from the data source 278. In some implementations, the database 112 stores a set of user preferences for each user. The user preferences may be used when the data visualization web application 270 (or desktop data visualization application 222) makes recommendations about how to view a set of data fields 280. In some implementations, the database 112 stores a data visualization history log 282, which stores information about each data visualization generated. In some implementations, the database 112 stores other information, including other information used by the data visualization application 222 or data visualization web application 270. The databases 112 may be separate from the data visualization server 290, or may be included with the data visualization server (or both).

In some implementations, the data visualization history log 282 stores visual specifications selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source 278, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 260 stores additional modules or data structures not described above.

Although FIG. 2B shows a data visualization server 290, FIG. 2B is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 290 may be stored or executed on a computing device 200. In some implementations, the functionality and/or data may be allocated between a computing device 200 and one or more servers 290. Furthermore, one of skill in the art recognizes that FIG. 2B need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

Figure 3:
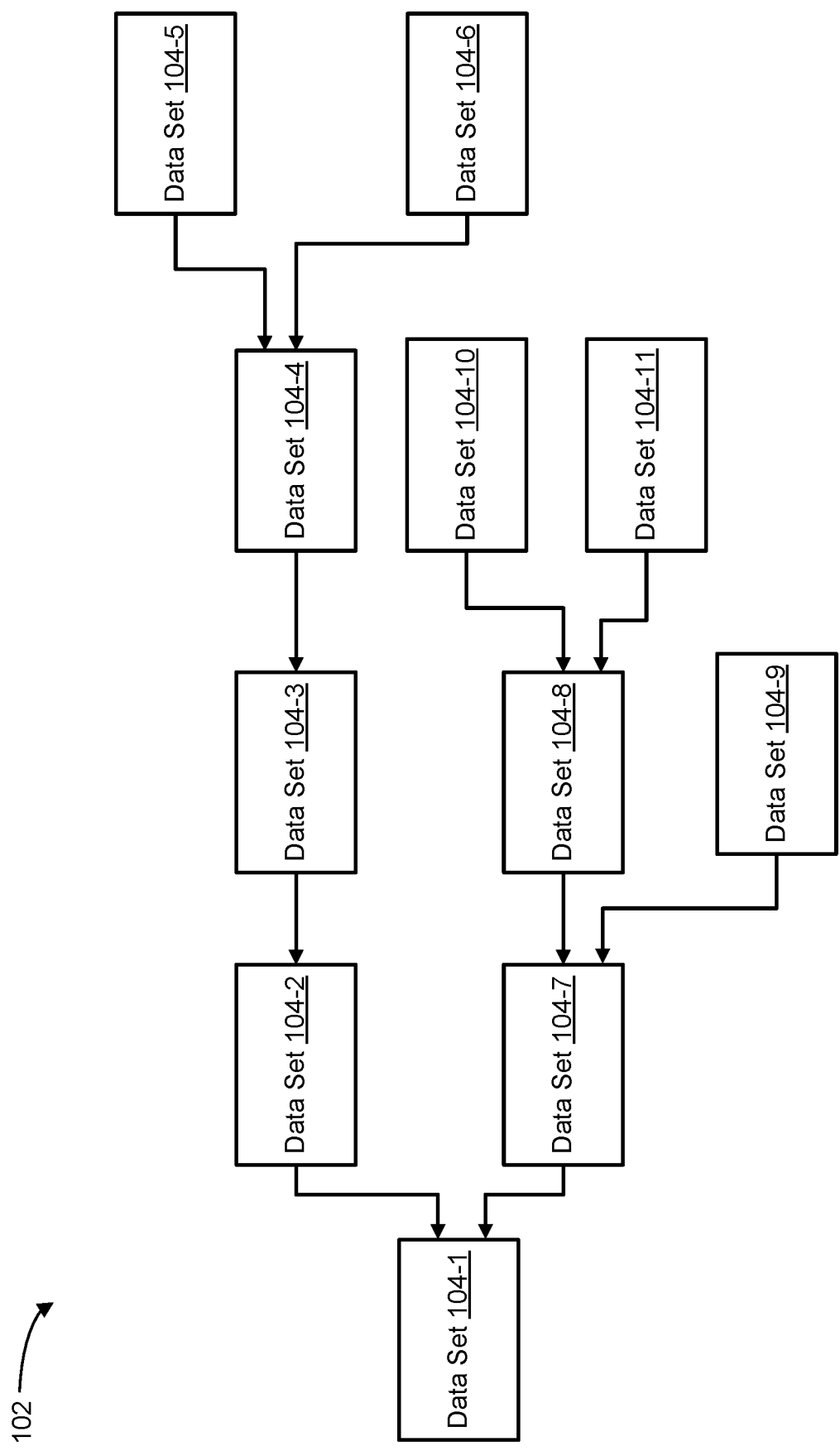
FIG. 3 is a block diagram of a hierarchical object model according to some implementations.

FIG. 3 shows an example of a hierarchical object model 102 in accordance with some implementations. An object model can be depicted as a graph, as shown in FIG. 3. As illustrated herein, the object model 102 is arranged so that the "many" side of each relationship is always to the left of the "one" side. The many-to-one relationships 106 in the object model 102 are illustrated by arrows, with the arrows originating from the "one" side of the relationship and pointing towards the "many" side of each relationship. The object model 102 includes multiple data sets 104, which are referred to individually as a data set 104-$n$ with n as a placeholder for a data set identifier (e.g., data set 102-1 is distinct from data set 104-2). The data sets 104 in the object model 102 have many-to-one relationships 106, connecting each data set 104-$n$ with at least one other data set and forming a tree. Thus, the tree structure illustrates different classes (data sets) in the object model 102, as well as the many-to-one relationships 106 between the data sets 104.

For example, the data sets 104-5 and 104-6 each has a direct many-to-one relationship to the data set 104-4. Each of the data sets 104-5 and 104-6 can be described as being "upstream" from the data set 104-4.

In a second example, the data set 104-3 is related to each of the data sets 104-5 and 104-6 via sequences of two many-to-one relationships. Thus, the data set 104-3 can be described as being "downstream" from each of the data sets 104-5 and 104-6. Referring to the relationship between the data sets 104-3 and 104-7, the data set 104-7 is not related to the data set 104-3 via a sequence of many-to-one relationships or via a sequence of one-to-many relationships. Thus the data set 104-7 is not considered to be "upstream" or "downstream" from the data set 104-3. The data set 104-7 can be considered to be on a different "branch" of the tree. In the same way, the data sets 104-8, 104-9, 104-10, and 104-11, which are part of the same "branch," are neither "upstream" nor "downstream" from any of the data sets 104-2, 104-3, 104-4, 104-5, and 104-6, which form a different "branch" on the tree.

In some implementations, the object model 102 may be displayed in a data visualization application 222 (or a data visualization web application 270) and the object model 102 may allow user interaction or user input to view or select the data sets 104 and data fields 280 in each data set 104 to generate a data visualization or build a new data source.

To generate a new data source using information in the database represented by an object model, a data source generator 226 propagates applied filter conditions to related data sets in order to include the appropriate data in the new data source. The data source generator 226 utilizes the many-to-one relationships in the object model to determine how the applied filter conditions are propagated across the data model.

Propagating filter conditions downstream in the object model coincides with user expectations, and is implemented using inner joins to the data set that is filtered. However, for upstream data sets in the object model, filtering would produce a result contrary to user expectations. Therefore, upstream data sets are not filtered. Upstream data sets are combined using outer joins.

For example, consider a new data source to be constructed for the three data sets 104-1, 104-2, and 104-3 in FIG. 3, and assume that a filter condition will be applied to the second data source 104-2. By using an inner join to the first data set 104-1, rows from the first data set 104-1 will be included in the generated data source only when they match with rows from the second data set 104-2 that satisfy the filter condition. On the other hand, applying a right outer join to the third data set 104-3 means that rows will be included in the generated data source even if they do not correspond to rows in the second data set 104-2 that satisfy the filter condition. The disparity between how data sets are joined is implemented by the data source generator 226, not by the user who is building the new data source.

This example can be expanded to a more complex scenario. Adding a fourth data set 104-7 to the previous example, the right and third data sets 104-1 and 104-3 are used as before. Because the fourth data set 104-7 is not downstream from the second data set 104-2, the fourth data set 104-7 is joined using a right outer join to the first data set 104-1.

In this way, the data source generator 226 creates new data sources by joining data sets based on their relationship to the primary data set. To meaningfully implement a user selected filter condition that has been applied to a data field in the primary data set, the data source generator 226 performs different types of joins between data sets to generate the new data source. In general, the data source generator 226 performs an inner join (directly or indirectly) between the primary data set and all data sets that are "downstream" from the primary data source, effectively propagating the applied filter condition throughout these "downstream" data sets to include only information that satisfies the applied filter condition. For data sets that are not "downstream" from the primary data set, including data sets that are "upstream" from the primary data set and data sets that are part of a different "branch" than the primary data set, the data source generator 226 performs a right outer join (directly or indirectly) between the primary data set and all data sets that are not "downstream" from the primary data set.

Thus, the hierarchical organization of an object model makes it easy for a user to meaningfully extract information from a database for inclusion in a new data source using selected filter conditions without requiring the user to understand the specific relationships or manually select how to join the data sets. The data extraction can be faster because selected filter conditions are automatically propagated only to downstream data sets and not to all data sets in the database.

Figure 4A:
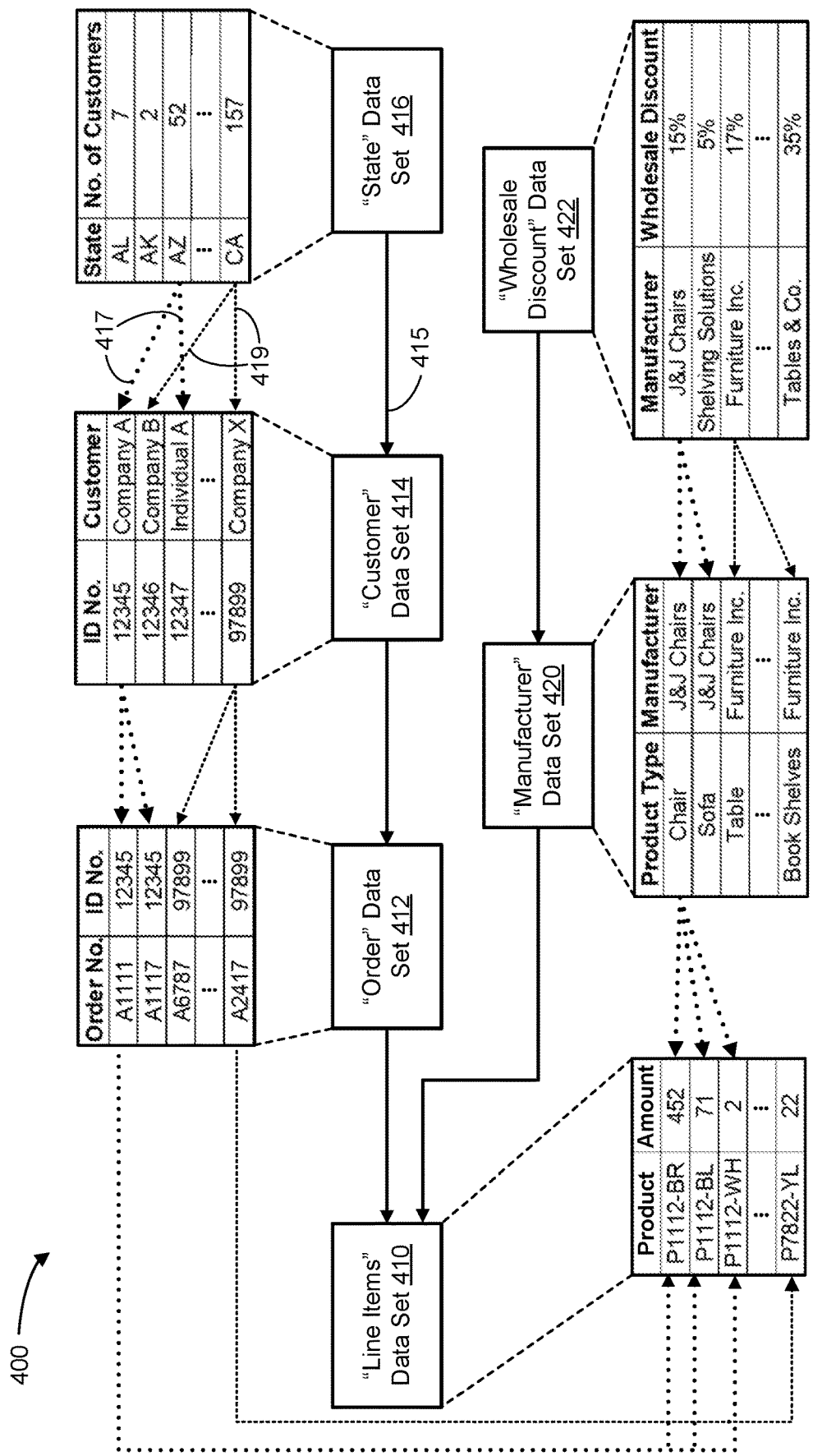

FIGS. 4A-4E provide an example of generating a new data source 490 (shown in FIG. 4E) from a hierarchical object model according to some implementations. FIG. 4A illustrates a specific object model 400, which includes six data sets. In this example, each data set corresponds to a database table. As illustrated, the object model 400 is arranged so that the "many" side of each relationship is always to the left of the "one" side. The many-to-one relationships between different data sets are illustrated by arrows, with the arrows originating from the "one" side of the relationship and pointing towards the "many" side of each relationship. The dashed and dotted lines illustrate the many-to-one relationships between information contained in each data set. For example, the arrow 415 indicates that the "State" data set 416 has a one-to-many relationship with the "Customer" data set 414.

Referring to the data sets shown in FIG. 4A, the State data set 416 has data fields that specify state and the number of customers in each state. The State data set also includes data fields that specify more information about each state, such as state name. In this example, there are 7 customers in Alabama (AL), 2 customers in Alaska (AK), 52 customers in Arizona (AZ), and 157 customers in California (CA). The Customer data set 414 contains data fields that specify customer name (e.g., "company A") and ID numbers (e.g., "12345"). The Customer data set 414 also includes a state code (not shown), which matches to the "State" data field in the State data set 416. The dotted lines 417 show that Company A (ID No. 12345) and Individual A (ID No. 12347) are both customers in Arizona. The dashed lines 419 show that Company B (ID No. 12346) and Company X (ID No. 97899) are two of the 157 customers in California. Similarly, the dashed and dotted lines between the Order data set 412 and the Customer data set 414 indicate that order numbers A1111 and A1117 were placed by Company A and order numbers A6787 and A2417 were placed by Company X. In this example, a customer may place multiple orders, but an individual customer is located in a single state.

The dashed and dotted lines between the Manufacturer data set 420 and the Wholesale Discount data set 422 indicate that J&J Chairs manufactures chairs and sofas and offers a 15% discount. Similarly, Furniture Inc. manufactures tables and book shelves and offers a 17% wholesale discount. The Manufacturer data set 420 also includes data fields that specify Product (not illustrated) as well as other properties about products (e.g., wholesale price).

The Line Items data set 410 specifies the individual line items included in an order. The Line Items data set 410 includes data fields that specify Order No. (correlating each line item to an order in the Order data set 412), Product (correlating each line item to a product in the manufacturer data set 420), Quantity, Amount (the total monetary amount for the line item), and other information about individual line items. Only a subset of the data fields are illustrated in FIG. 4A The dotted and dashed lines between the Order data set 412 and the Line Items data set 410 indicate that order number A1111 includes the products P1112-BR, P1112-BL, and P1112-WH, and that order number A2417 includes the product P7822-YL. The dotted and dashed lines between the Line Items data set 410 and the Manufacturer data set 420 indicate that the products P1112-BR, P1112-BL, and P1112-WH were manufactured by J&J Chairs. In this example, a manufacturer may produce many distinct products, but each manufacturer provides a single wholesale discount.

Figure 4B:
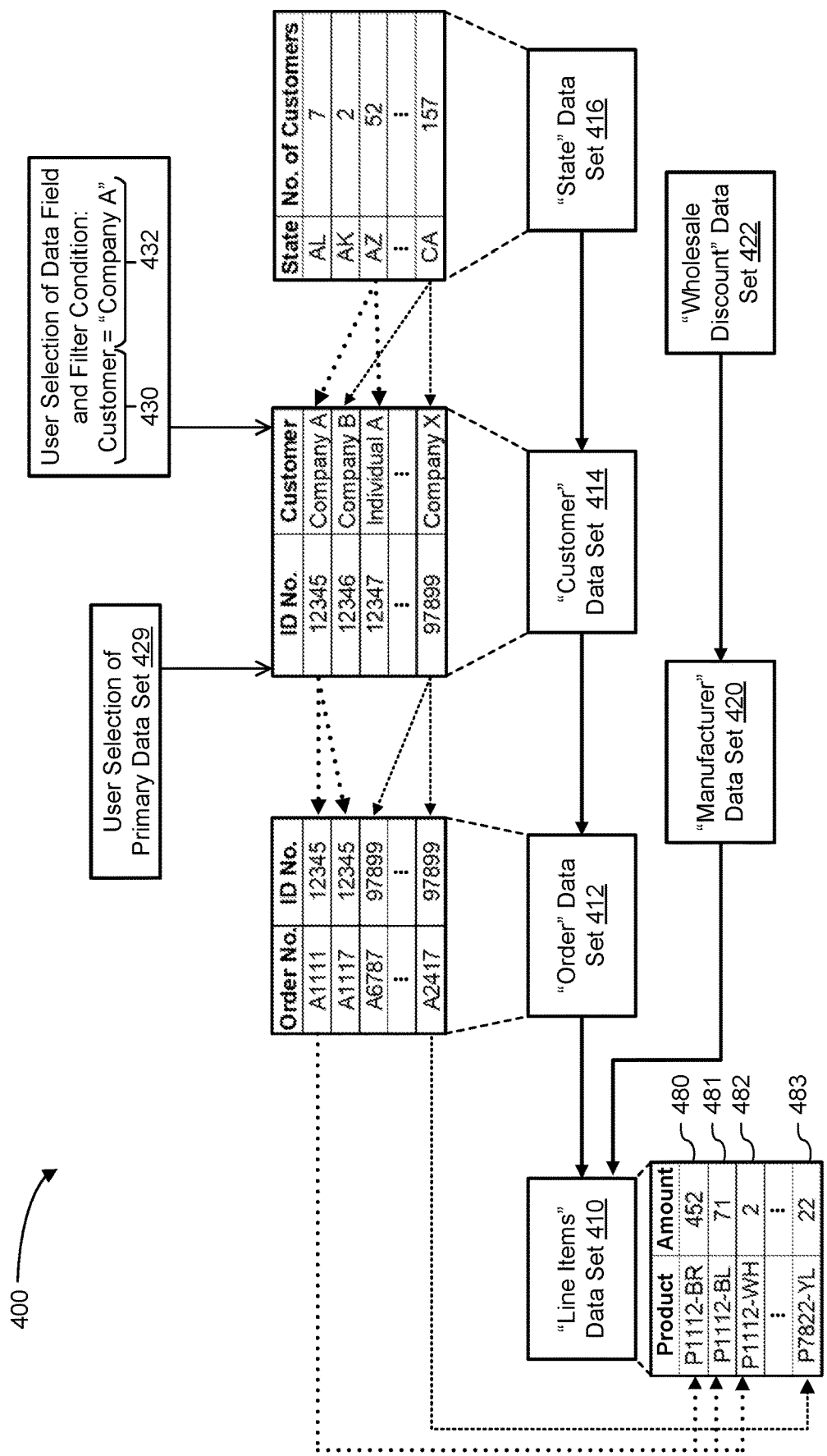

Referring to FIG. 4B, to generate a new data source 490 (shown in FIG. 4E) using information in a database represented by the object model 400, a user selects a primary data set 429, selects a data field 430 in the primary data set, and specifies a filter condition 432 to be applied to the selected data field 430. In this example, the user has selected the Customer data set 414 as the primary data set 429 and has selected the data field "Customer." As shown, the specified filter condition 432 limits the generated data source to data for "Company A". The data source generator 226 will generate a new data source based on the user selection of the data field 430 and the filter condition 432 by joining the selected data sets in the object model to the Customer data set 414.

Figure 4C:
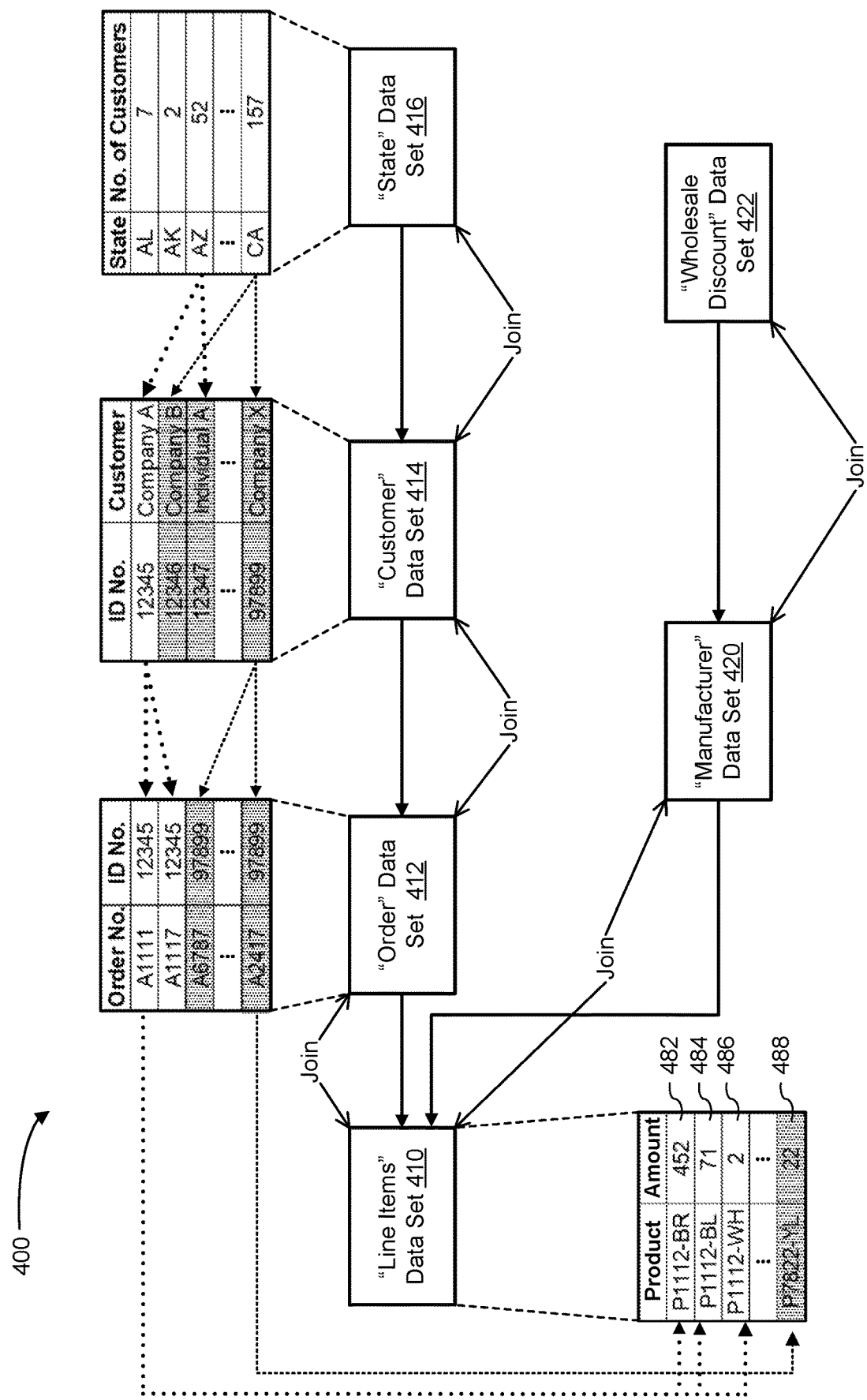

As shown in FIG. 4C, the data source generator 226 joins each of the data sets in the object model 400 to the primary data set 429, which in this example is Customer data set 414. The generated data source 490 in this example contains data from the Line Items data set 410, the Order data set 412, the Customer data set 414, and the State data set 416. Rows that will not be included in the generated data set have been grayed out. In particular, the filtering of the Customer data set 414 imposes filtering on the Line Items data set 410 and the Order data set 412 (i.e., there are only orders for the specified customer), but the State data set 416 is not filtered. The generated data set will include rows for states other than the location of "Company A".

Figure 4D:
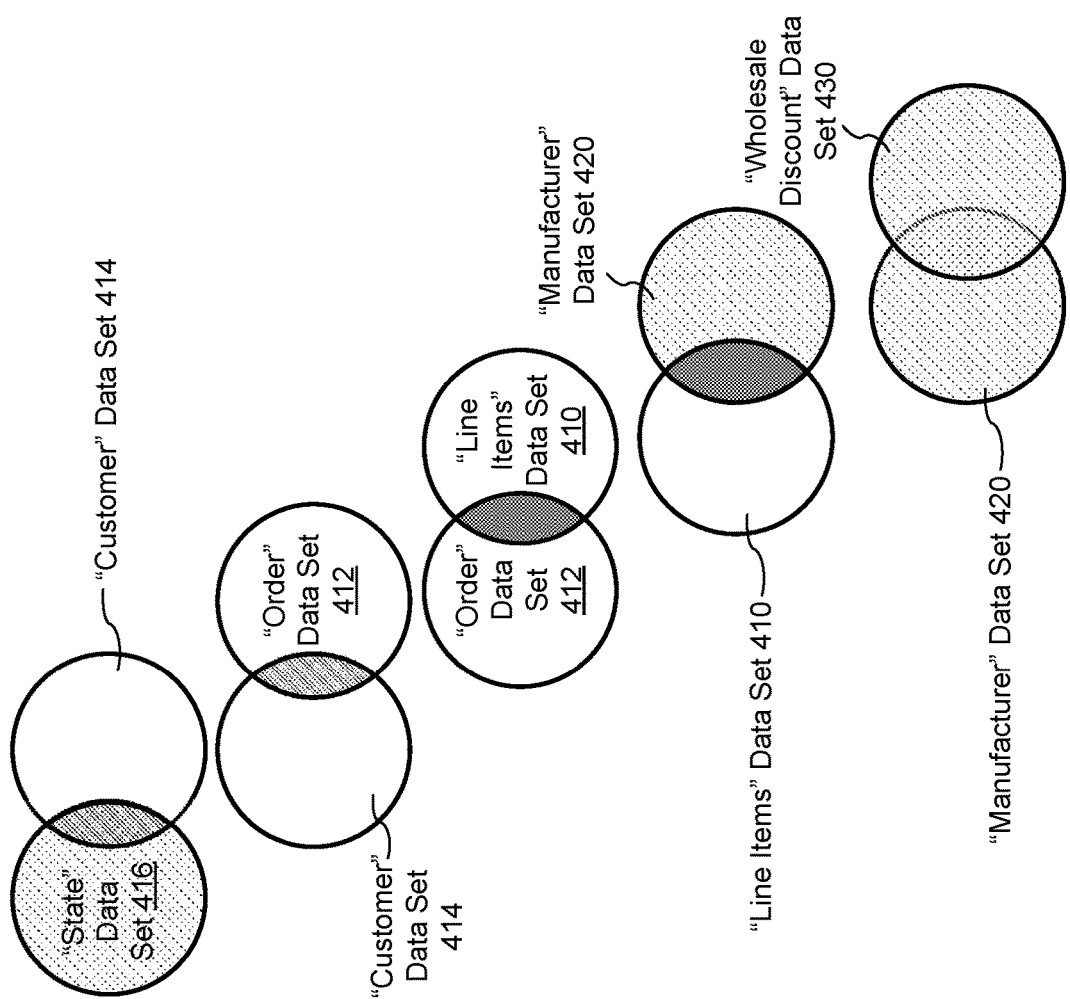

The Customer data set 414 has a many-to-one relationship with the State data set 416 (the data set 416 is "upstream" from the primary data set 414), so the filter condition is not applied to the State data set 416. When the data source generator 226 joins the data sets 414 and 416, rows in the Customer data set 414 that satisfy the filter condition are joined to rows of the data set 416, but any additional rows of the data set 416 (not joined to rows of the Customer data set 414) are included in the new data source 490 as well. As shown in FIG. 4D, the data source generator 226 performs an outer join between the data sets 414 and 416.

On the other hand, the Customer data set 414 has a one-to-many relationship with the Order data set 412 (the data set 412 is "downstream" from the data set 414). When the data source generator 226 joins the data sets 414 and 412, rows in the Customer data set 414 that satisfy the filter condition are joined to rows of the Order data set 412, so only orders for Company A are included. As shown in FIG. 4D, the data source generator 226 performs an inner join between the data sets 414 and 412.

The Customer data set 414 is related to the Line Items data set 410 via a sequence of two one-to-many relationships (the data set 410 is "downstream" from the data set 414). Thus, the Customer data set 414 and the Line Items data set 410 can be joined via the Orders data set 412. In other words, the data source generator 226 directly joins the Orders data set 412 and the Customer data set 414, as described above, and the data source generator 226 also directly joins the Line Items data set 410 with the Orders data set 412. In this way, only line items that correspond to orders for "Company A" are included in the generated data source. As shown in FIG. 4D, the data source generator 226 performs an inner join between the Line Items data set 410 and the Order data set 412. Thus, the Customer data set 414 is joined to the Line Items data set 410 via two inner joins.

If the Manufacturer data set 420 and Wholesale Discount data set 422 are included in the generated data source, they are joined using outer joins, as illustrated in FIG. 4D. In particular, the generated data source would include products from the Manufacturer data set 420 that were not purchased by "Company A".

The generated data source 490 in FIG. 4E combines data from the Line Items data set 410, the Order data set 412, the Customer data set 414, and the State data set 416. The new data source 490 includes data fields from each of these data sets. The first three rows 492, 494, and 496 of the generated data source correspond to the three rows 482, 484, and 486 in the Line Items data set 410 (see FIG. 4C). Because of the inner joins and the filter on the Customer data set 414, all of the grayed out rows shown in FIG. 4C are excluded from the generated data source 490. Each of the first four rows in the generated data source 490 corresponds to "Company A". Because of the outer join to the State data set 416, the generated data source 490 also includes some rows 498 that do not correspond to "Company A". For these additional rows 498, all of the columns (data fields) from the Line Items data set 410, the Order data set 412, and the Customer data set 414 are Null.

Note that the ID No. and Customer columns are Null for the additional rows 498, even though there are customers in these states. For the generated data source 490, the customers are limited to "Company A", so the only non-Null customer is "Company A". Also, because "No. of Customers" is a data field in the State data set 416, the data in this data field is not affected by the filter on the rows of the Customer data set 414 (e.g., the number of customers from California is 157, even though the Customer data field in the new data source 490 is Null).

This example includes a single filter condition applied to a single data field, but more data fields may be selected and more filter conditions may be applied. The data fields may be in a same data set or may be from different data sets within the object model.

Figure 5A:
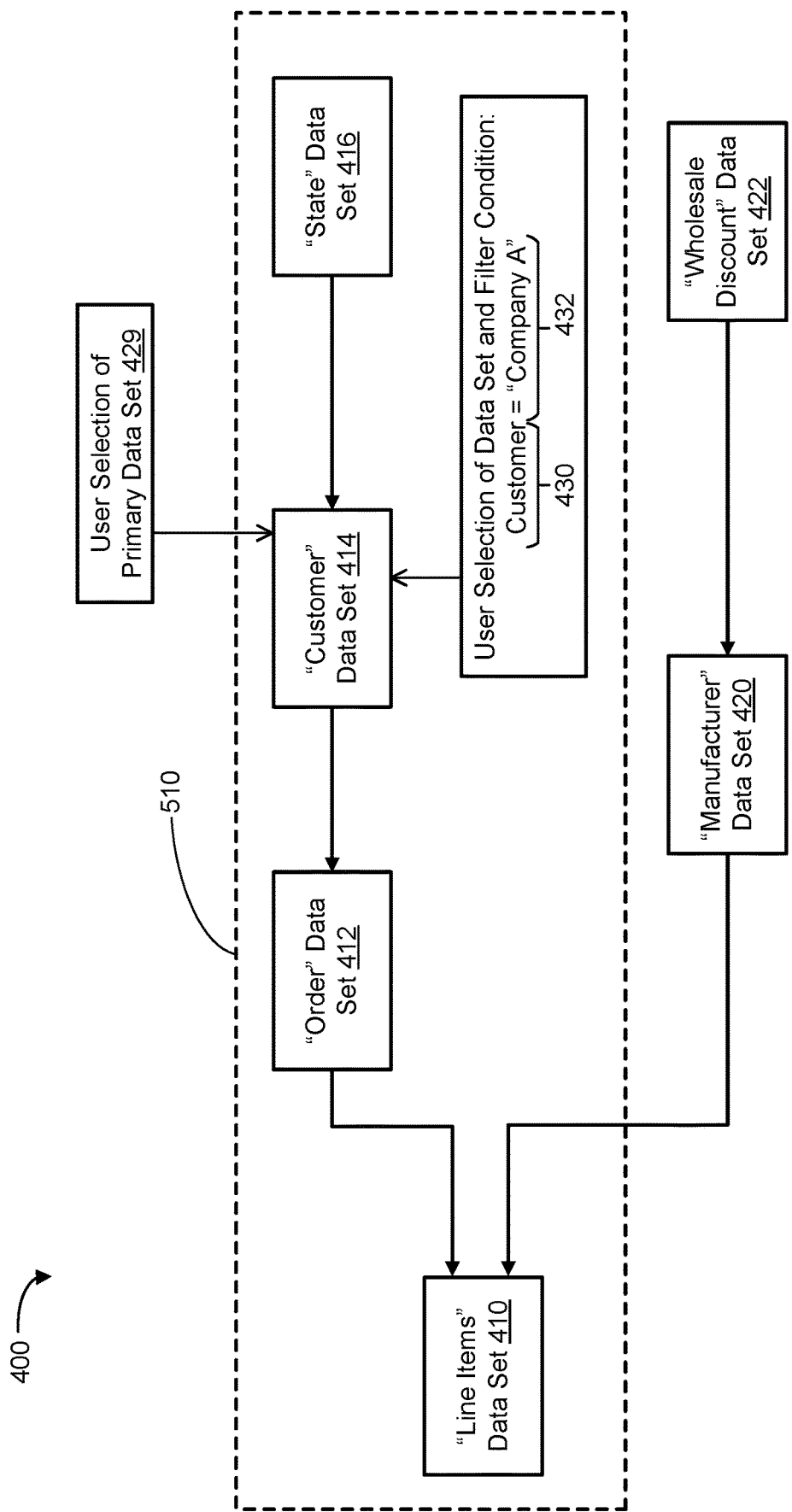
FIGS. 5A-5B provide an example of generating a data source from a hierarchical object model according to some implementations.
Figure 5B:
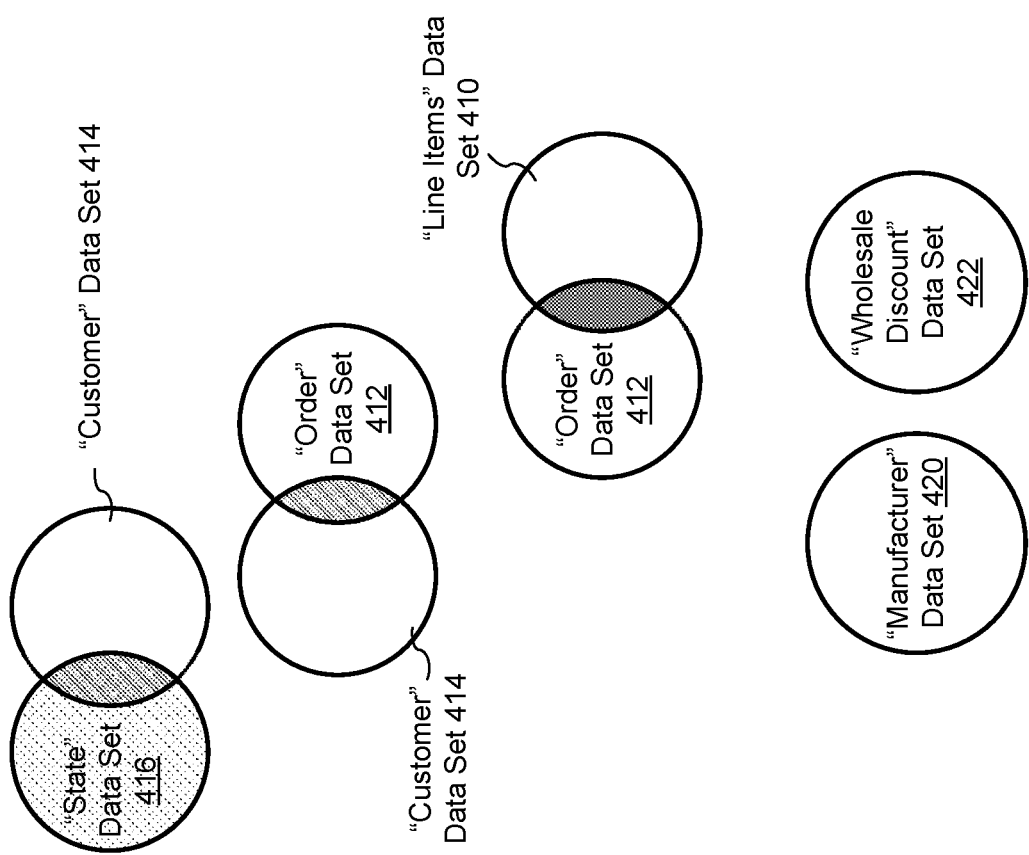

FIGS. 5A-5B provide an example of generating a new data source from a hierarchical object model according to some implementations. FIG. 5A illustrates the object model 400, described above with respect to FIG. 4A. To generate a new data source, a user selects a subset 510 of the data sets in the object model 400 that are to be included in the new data source. The user also selects a primary data set 429, a data field 430 that is in the primary data set 429, and a filter condition 432 to be applied to the selected data field 430. In this example, data set 414 is selected to be the primary data set 429, the selected data field 430 is the "Customer" data field, and the filter condition 432 that is applied to the selected data field 430 specifies that the "Customer" is "Company A". As shown, the data sets 410, 412, 414, and 416 are included in the user selected subset 510, and the data sets 420 and 422 were not selected to be included in the new data source. Thus, the data source generator 226 joins each data set in the selected subset to the Customer data set 414, and does not join (directly or indirectly) the Customer data set 414 to either the Manufacturer data set 420 or the Wholesale Discount data set 422.

FIG. 5B illustrates the joins between the selected subset of data sets and the primary data set 414. As shown, the data sets 420 and 422 are not joined with the Customer data set 414, or with any of the data sets that are joined to the Customer data set 414. The new data source includes information regarding line items that have been purchased by Company A, as well as all states. The generated data source is the same as the generated data source 490 in FIG. 4E.

FIGS. 6A-6I illustrate a flow chart of a method 600 of generating new data sources in accordance with some implementations. The method 600 is performed (604) at a computer system having one or more processors and memory. The memory stores (604) one or more programs configured for execution by the one or more processors. The method receives (610) user selection of a first data set (e.g., a primary data set such the data set 414, described above with respect to FIG. 4B) from a displayed object model of a database. The displayed object model includes (610) a plurality of data sets linked visually by many-to-one relationships to form a tree.

In some instances, the method 600 receives (609) user selection of a subset 510 of the plurality of data sets to be included in the new data source. The subset 510 of the plurality of data sets includes the first data set (e.g., the primary data set 414) and one or more secondary data sets. In such instances, generating the new data source 590 also includes joining (643) each data set of the subset 510 of the plurality of data sets to the first data set. Alternatively, generating the new data source includes joining (644) each data set of the tree to the first data set.

The method 600 also receives (620) user selection of a data field 430 of a plurality of data fields in the first data set (e.g., the data field "Customer" in the primary data set 414) and user specification of a first filter condition 432 for the selected data field (e.g., the applied filter condition requires that the data in the "Customer" data field must equal "Company A"). The method 600 further identifies (630) a second data set (e.g., any data set in the databased represented by the object model 400 other than primary data set 414) in the tree, and generates (640) a new data source by joining the first data set and the second data set. When the second data set is related to the first data set through a sequence of one or more many-to-one relationships (e.g., the second data set is "downstream" from the primary data set), the method 600 automatically generates (641) the new data source by joining, directly or indirectly, rows of the second data set to rows of the first data set that satisfy the first filter condition (e.g., using an inner join between data sets 414 and 412 or joining data sets 414 and 410 via an inner join between the data sets 414 and 412 and an inner join between data sets 412 and 410). When the second data set is not related to the first data set through a sequence of one or more many-to-one relationships (e.g., the second data set is not "downstream" from the primary data set), the method 600 automatically generates (642) the new data source by joining, directly or indirectly, rows of the second data set to rows of the first data set that satisfy the first filter condition and also includes all rows of the second data set (e.g., a left outer join between data sets 416 and 414, where the data set 416 is on the left or joining the data sets 414 and 420 via an inner join between data sets 414 and 412, an inner join between data sets 412 and 410, and a right outer join between data sets 410 and 420, where the data set 420 is on the right).

In some implementations, the method 600 includes, in response to receiving the user selection of the data field and the user specification of the filter condition, automatically applying (621) the filter condition 432 to the selected data field 430. In some instances, the filter condition 432 includes (622) a mathematical expression or includes (623) a logic operator and/or a Boolean operator (623). In some instances, the selected data field has (624) a numeric data type and the first filter condition specifies (624) a range of numeric values for the selected data field (e.g., the range from 100 to 200). In some instances, the selected data field stores discrete categorical values and the first filter condition specifies one or more discrete values for the selected data field.

In some instances, the method 600 receives (631) user selection of a second data field of a plurality of data fields of the second data set and/or receives (632) user specification of a second filter condition for the selected second data field. In such cases, when the second data set is related to the first data set through a sequence of one or more many-to-one relationships, the method 600 automatically generates (645) the new data source by joining rows of the second data set that satisfy the second filter condition to rows of the first data set that satisfy the first filter condition. Additionally, when the second data set is not related to the first data set through a sequence of one or more many-to-one relationships, the method 600 automatically generates (646) the data source by joining rows of the second data set that satisfy the second filter condition to rows of the first data set that satisfy the first filter condition and including all rows of the second data set that satisfy the second filter condition.

Figure 6A:
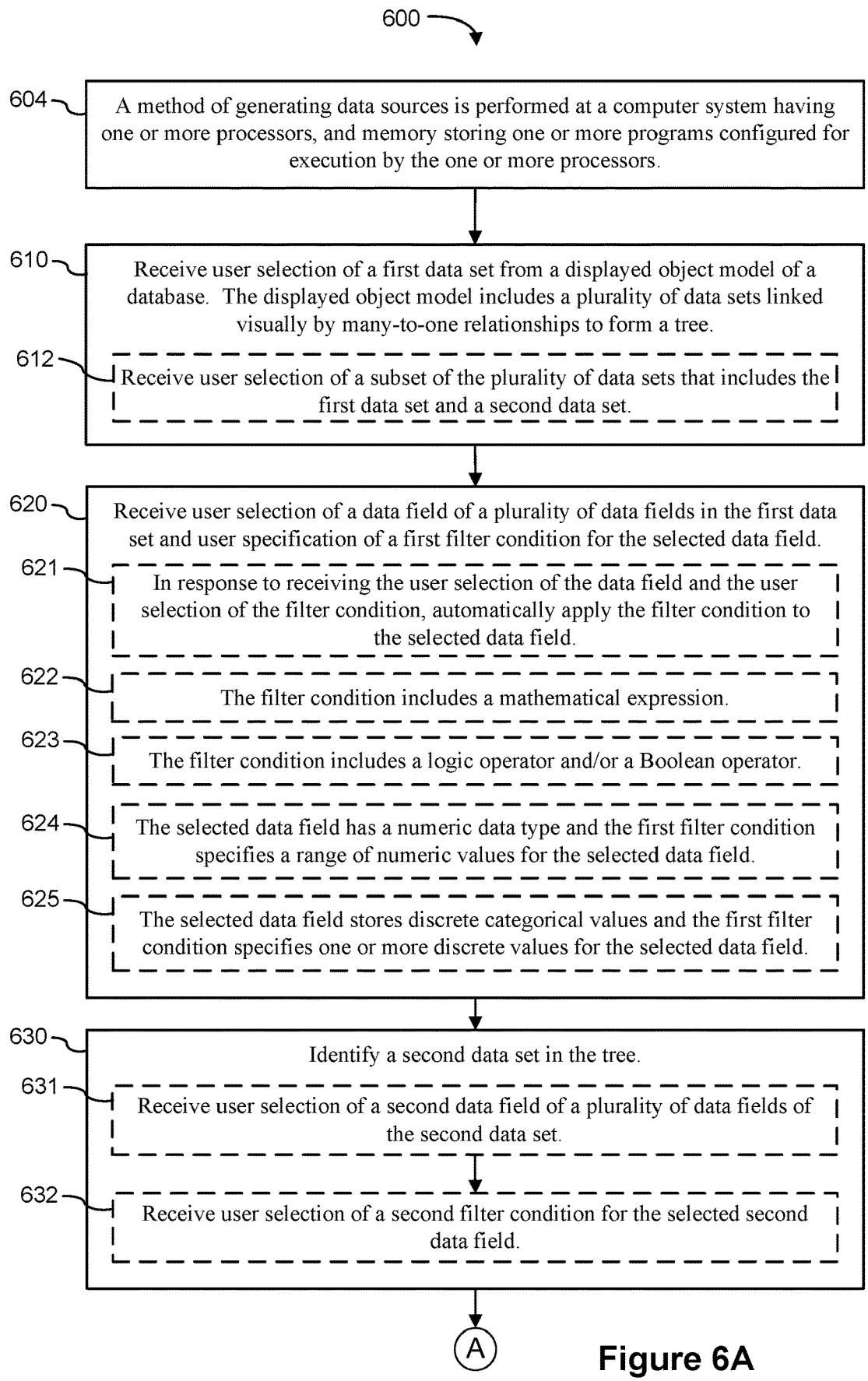
FIGS. 6A-6I provide a flow chart for a method of generating new data sources in accordance with some implementations.
Figure 6B:
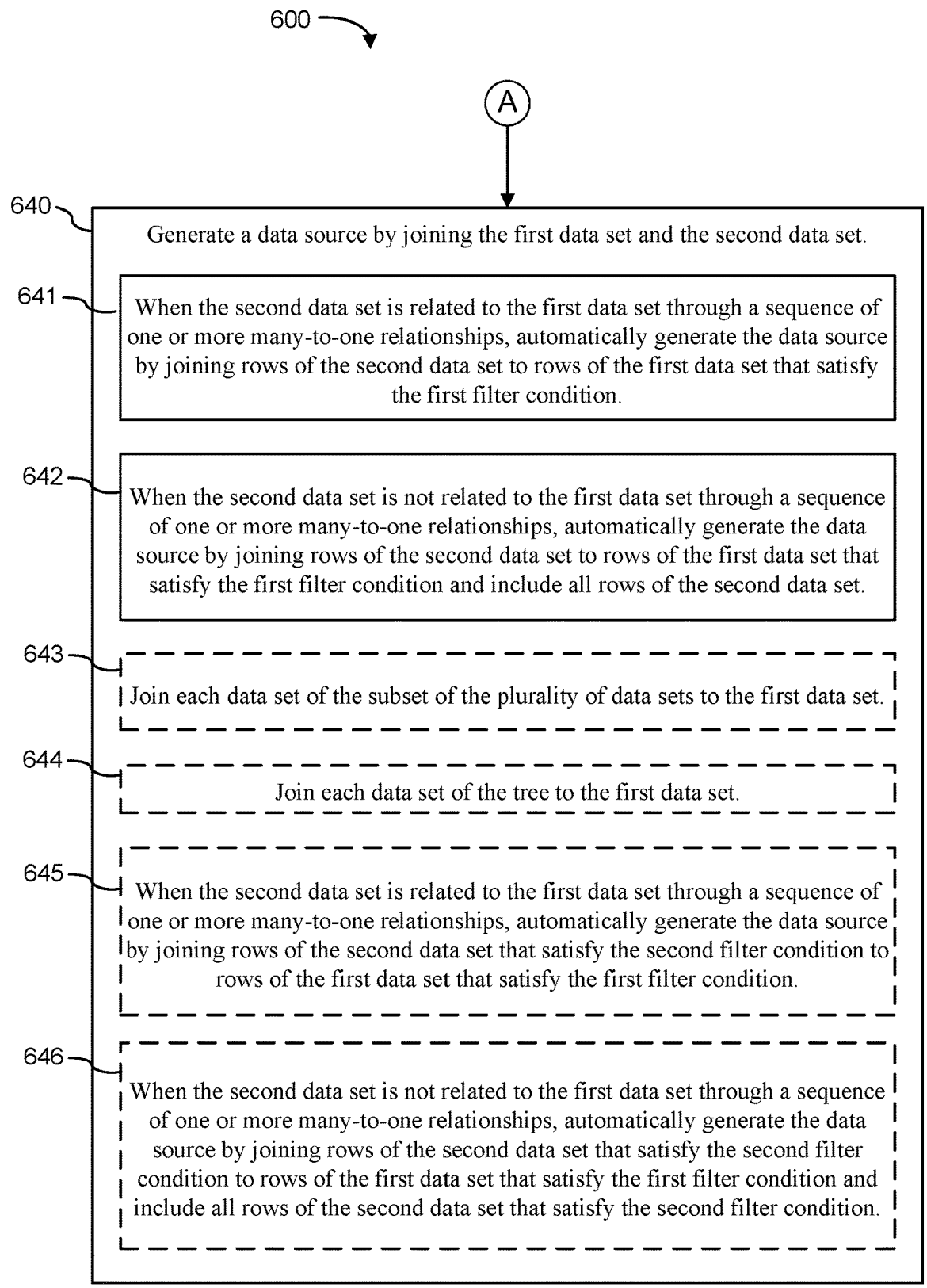
Figure 6C:
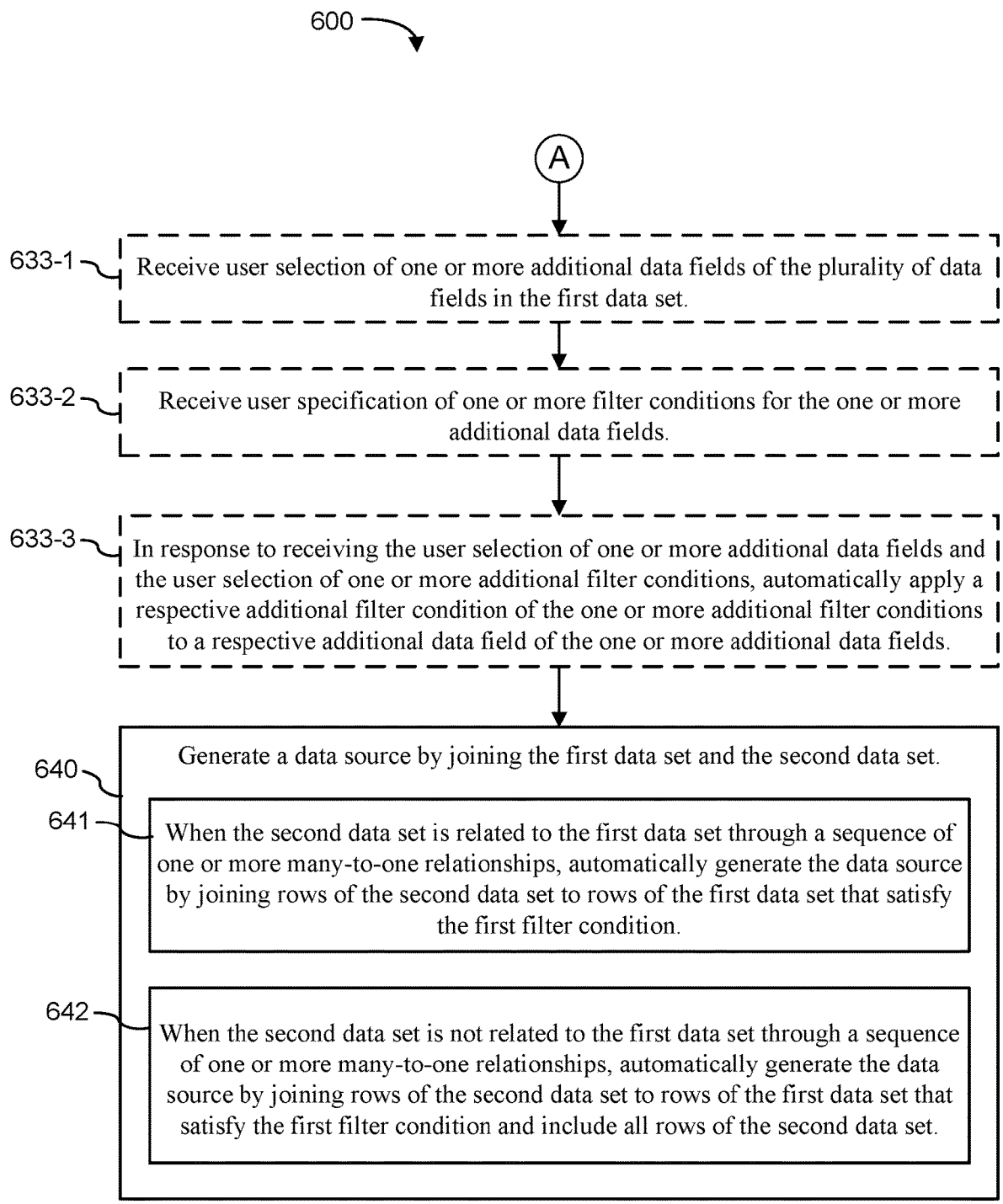

Referring to FIG. 6C, in some instances, the method 600 receives (633-1) user selection of one or more additional data fields of the plurality of data fields in the first data set and receives (633-2) user specification of one or more filter conditions for the one or more additional data fields. In response to receiving the user selection of one or more additional data fields and the user specification of the one or more additional filter conditions, the method 600 applies (633-3) a respective additional filter condition of the one or more additional filter conditions to a respective additional data field of the one or more additional data fields.

Figure 6D:
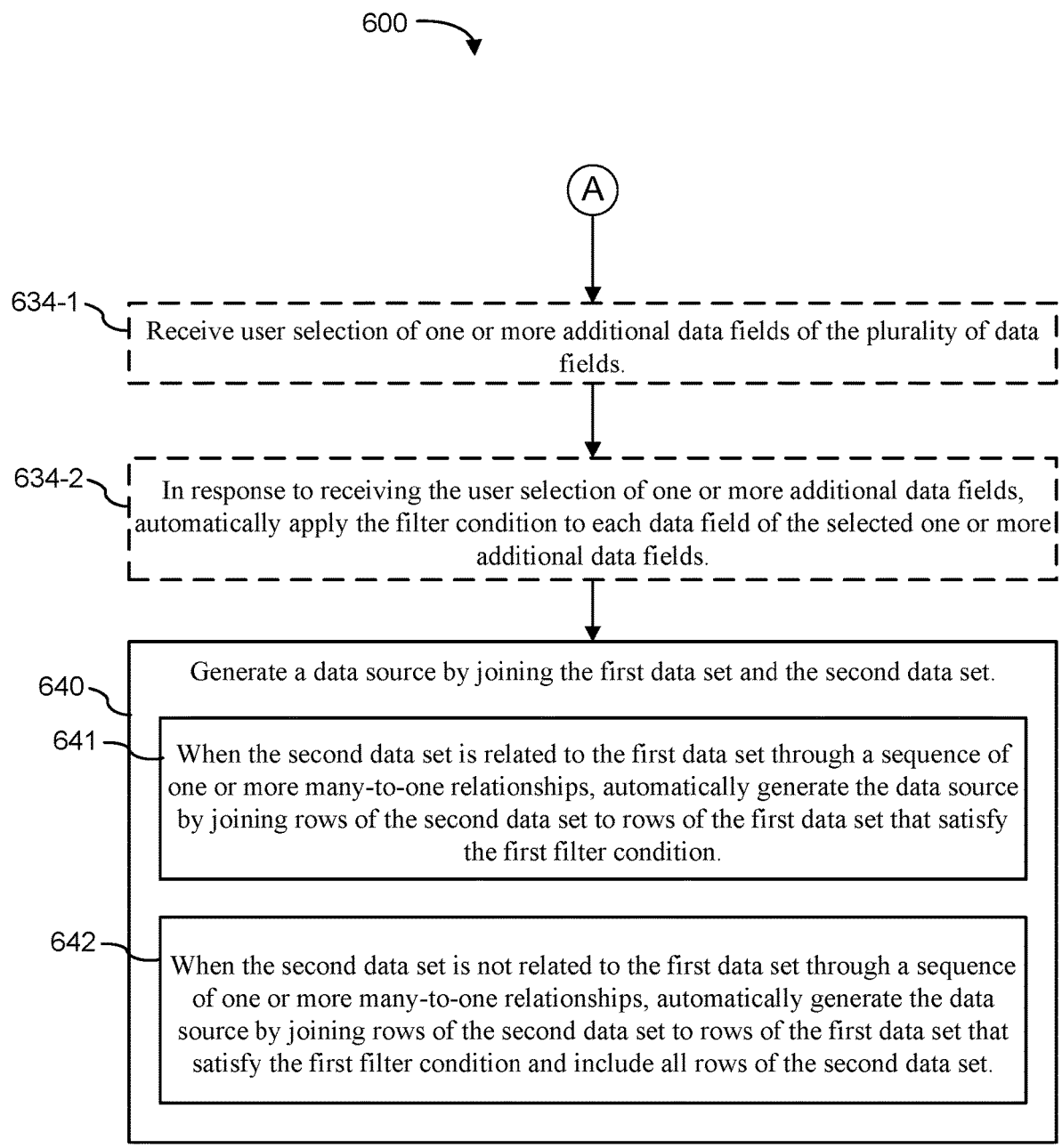

Referring to FIG. 6D, in some instances, the method 600 receives (634-1) user selection of one or more additional data fields of the plurality of data fields in the first data set and in response to receiving the user selection of one or more additional data fields, applies (634-2) the filter condition to each data field of the selected one or more additional data fields.

Figure 6E:
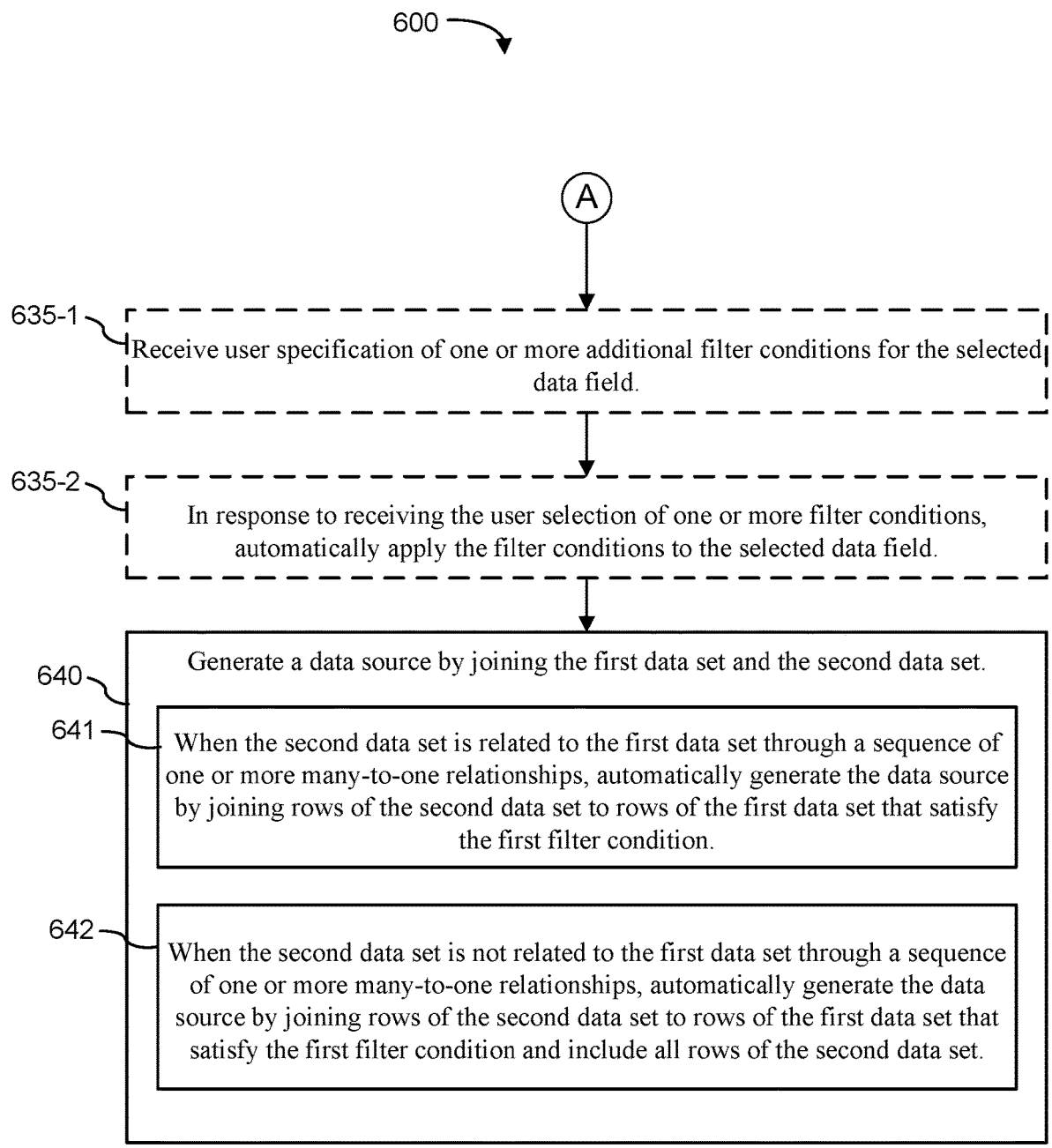

Referring to FIG. 6E, in some instances, the method 600 receives (635-1) user specification of one or more additional filter conditions for the selected data field and in response to receiving the user specification of the one or more additional filter conditions, automatically applies (635-2) the filter conditions to the selected data field.

Figure 6F:
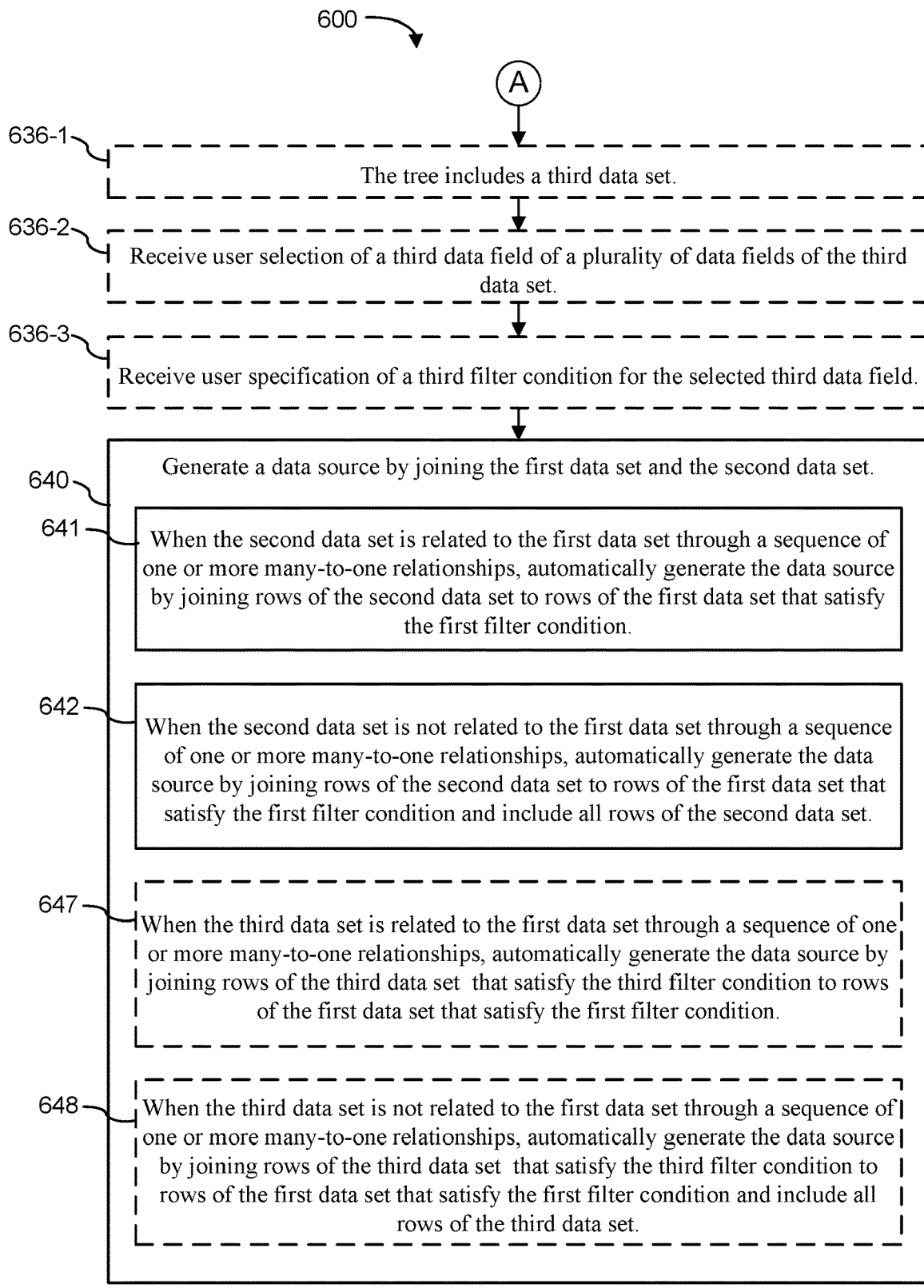

Referring to FIG. 6F, in some instances, the tree includes (636-1) a third data set (636-1), the method 600 receives (636-2) user selection of a third data field of a plurality of data fields of the third data set, and the method 600 receives (636-3) user specification of a third filter condition for the selected third data field. When the third data set is related to the first data set through a sequence of one or more many-to-one relationships, the method 600 automatically generates (647) the data source by joining rows of the third data set that satisfy the third filter condition to rows of the first data set that satisfy the first filter condition. When the third data set is not related to the first data set through a sequence of one or more many-to-one relationships, the method 600 automatically generates (648) the data source by joining rows of the third data set that satisfy the third filter condition to rows of the first data set that satisfy the first filter condition and includes all rows of the third data set.

Figure 6G:
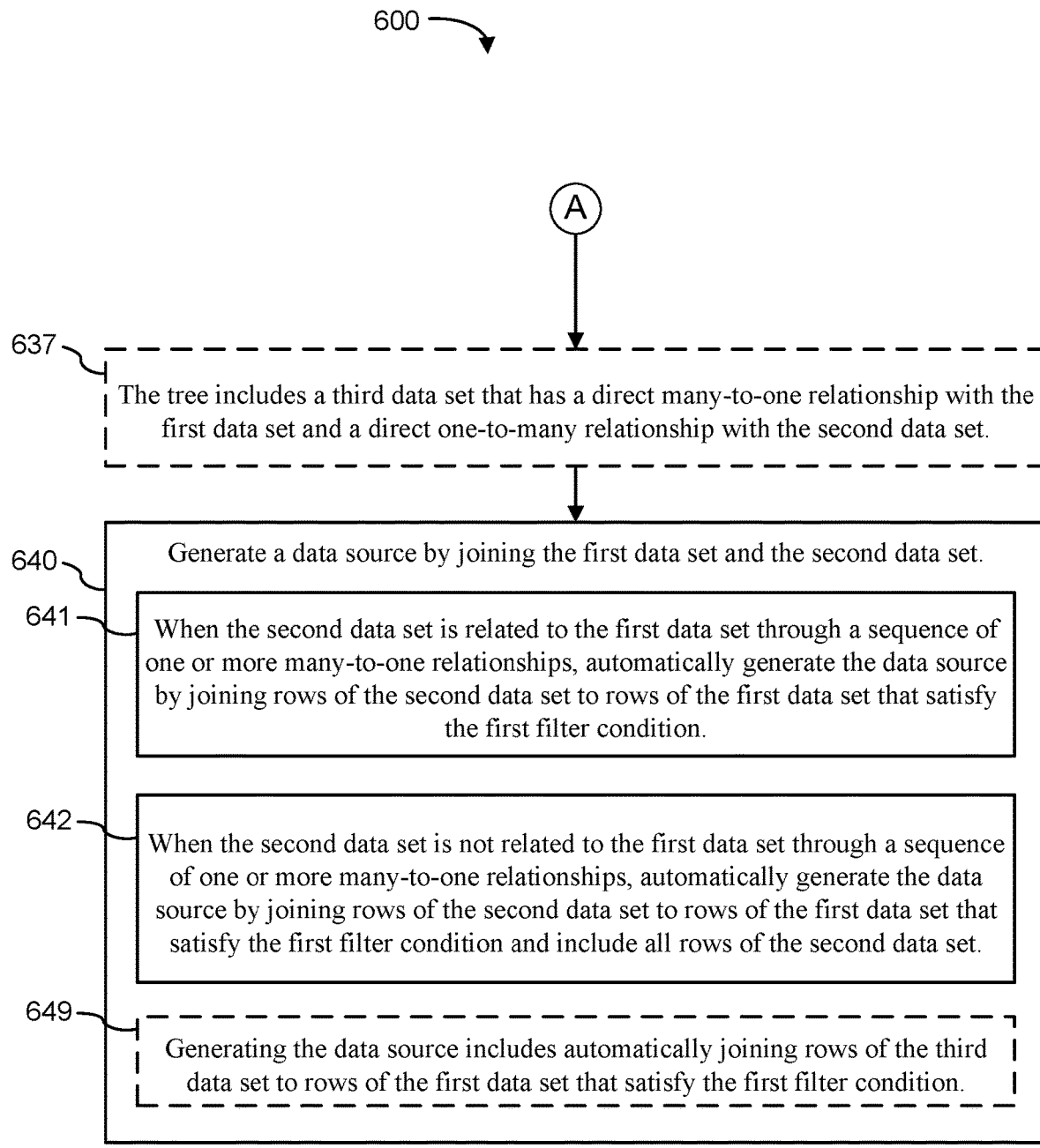

Referring to FIG. 6G, in some instances, the tree includes (637) a third data set (e.g., the data set 412) that has a direct many-to-one relationship with the first data set (e.g., the data set 414) and a direct one-to-many relationship with the second data set (e.g., the data set 410). In such cases, generating the data source includes (649) automatically joining rows of the third data set to rows of the first data set that satisfy the first filter condition.

Figure 6H:
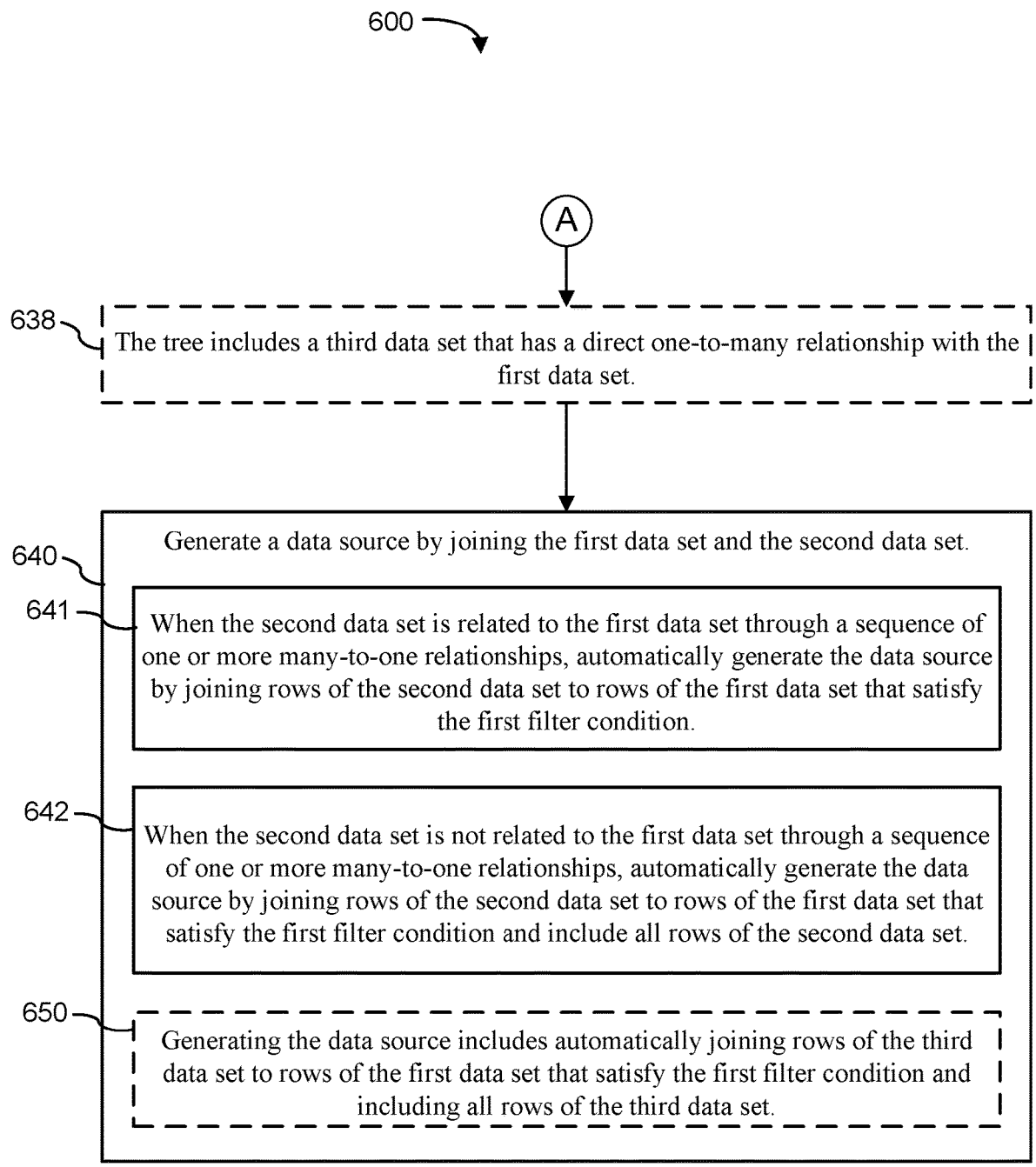

Referring to FIG. 6H, in some instances, the tree includes (638) a third data set (e.g., the data set 416) that has a direct one-to-many relationship with the first data set (e.g., the data set 414). In such cases, generating the data source includes (650) automatically joining rows of the third data set to rows of the first data set that satisfy the first filter condition and including all rows of the third data set (e.g., performing a right outer join between the data sets 414 and 416, where the data set 416 is on the right).

Figure 6I:
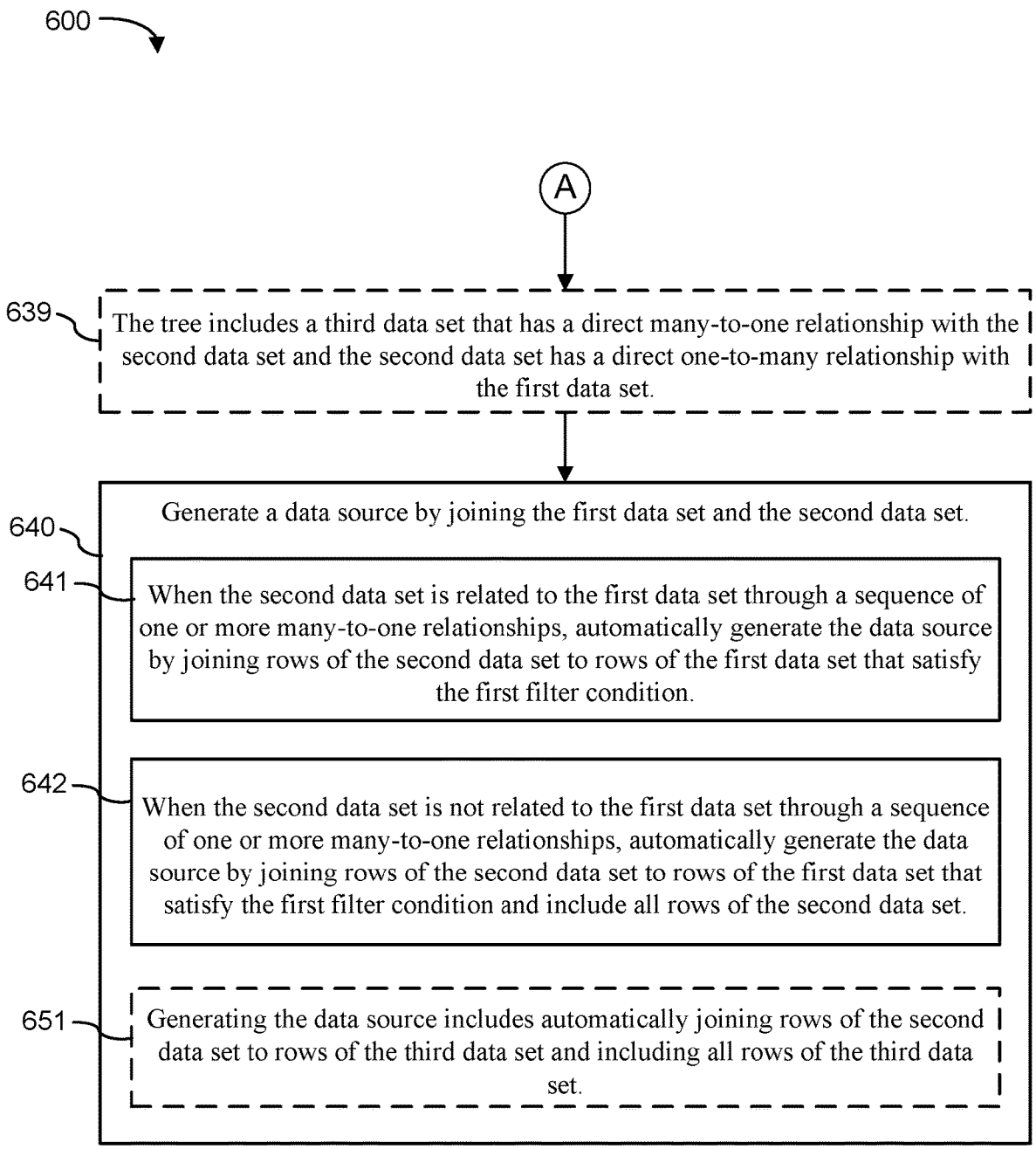

Referring to FIG. 6I, in some instances, the tree includes (639) a third data set (e.g., the data set 420) that has a direct one-to-many relationship with the second data set (e.g., data set 410) and the second data set has a direct many-to-one relationship with the first data set (e.g., the data set 412). In such cases, generating the new data source includes (651) automatically joining rows of the second data set to rows of the third data set and including all rows of the third data set (e.g., performing a right outer join between data sets 410 and 420, where the data set 420 is on the right).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of generating data sources, the method comprising:
   at a computer system having one or more processors, and memory storing one or more programs configured for execution by the one or more processors:
      receiving user selection of a first data set from a displayed object model of a database, wherein the displayed object model includes a plurality of data sets linked visually by many-to-one relationships to form a tree;
      receiving user selection of a data field of a plurality of data fields in the first data set and user specification of a first filter condition for the selected data field;
      receiving user selection of a second data set from the displayed object model; and
      generating a data source by joining the first data set and the second data set, wherein:
         in accordance with a determination that the second data set is related to the first data set through a sequence of one or more many-to-one relationships, automatically generating the data source by joining rows of the second data set to rows of the first data set that satisfy the first filter condition; and
         in accordance with a determination that the second data set is not related to the first data set through a sequence of one or more many-to-one relationships, automatically generating the data source by joining rows of the second data set to rows of the first data set that satisfy the first filter condition and including all rows of the second data set.

2. The method of claim 1, wherein:
   the tree includes a third data set that has a direct many-to-one relationship with the first data set and a direct one-to-many relationship with the second data set; and
   generating the data source includes automatically joining rows of the third data set to rows of the first data set that satisfy the first filter condition.

3. The method of claim 1, wherein:
   the tree includes a third data set that has a direct one-to-many relationship with the first data set; and
   generating the data source includes automatically joining rows of the third data set to rows of the first data set that satisfy the first filter condition and including all rows of the third data set.

4. The method of claim 1, wherein:
   the second data set has a direct many-to-one relationship with the first data set;
   the tree includes a third data set that has a direct one-to-many relationship with the second data set; and
   generating the data source includes automatically joining rows of the second data set to rows of the third data set and including all rows of the third data set.

5. The method of claim 1, further comprising:
   receiving user selection of a second data field of a plurality of data fields of the second data set; and
   receiving user specification of a second filter condition for the selected second data field, wherein:
      generating the data source further includes:
         in accordance with a determination that the second data set is related to the first data set through a sequence of one or more many-to-one relationships, automatically generating the data source by joining rows of the second data set that satisfy the second filter condition to rows of the first data set that satisfy the first filter condition; and
         in accordance with a determination that the second data set is not related to the first data set through a sequence of one or more many-to-one relationships, automatically generating the data source by joining rows of the second data set that satisfy the second filter condition to rows of the first data set that satisfy the filter condition and including all rows of the second data set that satisfy the second filter condition.

6. The method of claim 1, wherein the tree includes a third data set, the method further comprising:
   receiving user selection of the third data set;

receiving user selection of a third data field of a plurality of data fields of the third data set; and receiving user specification of a third filter condition for the selected third data field, wherein:

generating the data source further includes:

in accordance with a determination that the third data set is related to the first data set through a sequence of one or more many-to-one relationships, automatically generating the data source by joining rows of the third data set that satisfy the third filter condition to rows of the first data set that satisfy the first filter condition; and in accordance with a determination that the third data set is not related to the first data set through a sequence of one or more many-to-one relationships, automatically generating the data source by joining rows of the third data set that satisfy the third filter condition to rows of the first data set that satisfy the filter condition and including all rows of the third data set.

7. The method of claim 1, further comprising:

receiving user selection of a subset of the plurality of data sets, wherein:

the selected subset of the plurality of data sets includes the first data set and the second data set; and generating the data source includes joining each data set of the subset of the plurality of data sets to the first data set.

8. The method of claim 1, wherein generating the data source includes joining each data set of the tree to the first data set.

9. The method of claim 1, further comprising:

in response to receiving the user selection of the data field and the user selection of the filter condition, automatically applying the filter condition to the selected data field.

10. The method of claim 1, further comprising:

receiving user selection of one or more additional data fields of the plurality of data fields in the first data set;

receiving user selection of one or more additional filter conditions for the one or more additional data fields; and in response to receiving the user selection of one or more additional data fields and the user selection of one or more additional filter conditions, automatically applying a respective additional filter condition of the one or more additional filter conditions to a respective additional data field of the one or more additional data fields.

11. The method of claim 1, further comprising:

receiving user specification of one or more additional filter conditions for the selected data field; and in response to receiving the user specification of the one or more additional filter conditions, automatically applying the one or more additional filter conditions to the selected data field.

12. The method of claim 1, wherein the selected data field has a numeric data type and the first filter condition specifies a range of numeric values for the selected data field.

13. The method of claim 1, wherein the selected data field stores discrete categorical values and the first filter condition specifies one or more discrete values for the selected data field.

14. The method of claim 1, wherein the first filter condition includes a mathematical expression.

15. The method of claim 1, wherein the first filter condition includes a Boolean combination of filter conditions that operate on a plurality of data fields in the first data set.

16. A computing device, comprising:

one or more processors;

memory;

a display; and one or more programs stored in the memory and configured for execution by the one or more processors, the one or more programs comprising instructions for:

receiving user selection of a first data set from a displayed object model of a database, wherein the displayed object model includes a plurality of data sets linked visually by many-to-one relationships to form a tree;

receiving user selection of a data field of a plurality of data fields in the first data set and user specification of a first filter condition for the selected data field;

receiving user selection of a second data set from the displayed object model; and generating a data source by joining the first data set and the second data set, wherein:

in accordance with a determination that the second data set is related to the first data set through a sequence of one or more many-to-one relationships, automatically generating the data source by joining rows of the second data set to rows of the first data set that satisfy the filter condition; and in accordance with a determination that the second data set is not related to the first data set through a sequence of one or more many-to-one relationships, automatically generating the data source by joining rows of the second data set to rows of the first data set that satisfy the filter condition and including all rows of the second data set.

17. The computing device of claim 16, wherein:

the tree includes a third data set that has a direct many-to-one relationship with the first data set and a direct one-to-many relationship with the second data set; and generating the data source includes automatically joining rows of the third data set to rows of the first data set that satisfy the first filter condition.

18. The computing device of claim 16, wherein:

the tree includes a third data set that has a direct one-to-many relationship with the first data set; and generating the data source includes automatically joining rows of the third data set to rows of the first data set that satisfy the first filter condition and including all rows of the third data set.

19. The computing device of claim 16, wherein:

the second data set has a direct many-to-one relationship with the first data set;

the tree includes a third data set that has a direct one-to-many relationship with the second data set; and generating the data source includes automatically joining rows of the second data set to rows of the third data set and including all rows of the third data set.

20. A non-transitory computer readable storage medium storing one or more programs configured for execution by a computing device having one or more processors, memory, and a display, the one or more programs comprising instructions for:

receiving user selection of a first data set from a displayed object model of a database, wherein the displayed object model includes a plurality of data sets linked visually by many-to-one relationships to form a tree;

receiving user selection of a data field of a plurality of data fields in the first data set and user specification of a first filter condition for the selected data field;

receiving user selection of a second data set from the displayed object model; and generating a data source by joining the first data set and the second data set, wherein:

in accordance with a determination that the second data set is related to the first data set through a sequence of one or more many-to-one relationships, automatically generating the data source by joining rows of the second data set to rows of the first data set that satisfy the filter condition; and in accordance with a determination that the second data set is not related to the first data set through a sequence of one or more many-to-one relationships, automatically generating the data source by joining rows of the second data set to rows of the first data set that satisfy the filter condition and including all rows of the second data set.

* * * * *